(12) United States Patent
Massa et al.

(10) Patent No.: US 7,494,704 B2
(45) Date of Patent: Feb. 24, 2009

(54) MATERIAL, ARTICLE AND METHOD OF PREPARING MATERIALS CONTAINING ORIENTED ANISOTROPIC PARTICLES

(75) Inventors: Dennis J. Massa, Pittsford, NY (US);
Thomas N. Blanton, Rochester, NY (US); Debasis Majumdar, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 263 days.

(21) Appl. No.: 10/219,584

(22) Filed: Aug. 15, 2002

(65) Prior Publication Data

US 2004/0033352 A1 Feb. 19, 2004

(51) Int. Cl.
*B32B 5/16* (2006.01)
(52) U.S. Cl. ..................... 428/323; 428/364
(58) Field of Classification Search ................ 428/323, 428/364
See application file for complete search history.

(56) References Cited

U.S. PATENT DOCUMENTS

| | | | | | |
|---|---|---|---|---|---|
| 3,485,621 | A | * | 12/1969 | Kazan | |
| 3,972,715 | A | * | 8/1976 | Okumura | |
| 4,454,194 | A | * | 6/1984 | Luebbe, Jr. | |
| 4,915,925 | A | * | 4/1990 | Chung | 423/447.1 |
| 4,946,892 | A | * | 8/1990 | Chung | 524/847 |
| 5,260,124 | A | * | 11/1993 | Gaier | 442/219 |
| 5,376,611 | A | | 12/1994 | Shveima | |
| 5,660,877 | A | | 8/1997 | Venkataramani et al. | |
| 5,891,611 | A | * | 4/1999 | Majumdar et al. | 430/529 |
| 6,515,649 | B1 | * | 2/2003 | Albert et al. | |

FOREIGN PATENT DOCUMENTS

| | | |
|---|---|---|
| EP | 1 122 227 A2 | 8/2001 |
| EP | 1 245 549 A2 | 10/2002 |
| JP | 2001 294676 A | 10/2001 |
| JP | 2001 322139 A | 11/2001 |
| JP | 2001 335602 A | 12/2001 |
| JP | 2002 056719 A | 2/2002 |
| WO | 98/40431 A | 9/1998 |

OTHER PUBLICATIONS

Faivre et al., "Phase transitions of fluids in porous silicon", Eur. Phys. J. B 7, 19-36, 1998.*
A. Celzard, E. McRae, J.F. Mareche, G. Furdin, M. Dufort, and C. Deleuze, *Composites Based on Micron-Sized Exfoliated Graphite Particles: Electrical Conduction, Critical Exponents and Anisotropy*, J. Phys. Chem. Solids, vol. 57, pp. 715-715, (1996).

(Continued)

*Primary Examiner*—H. T Le
(74) *Attorney, Agent, or Firm*—Lynne M. Blank

(57) ABSTRACT

The present invention relates to a method for preparing oriented anisotropic particles comprising the steps of providing at least one anisotropic particle, dispersing the one anisotropic particle(s) in a medium, and freeze drying the dispersion of anisotropic particle(s) and the medium. In another embodiment, the present invention relates to an oriented anisotropic material comprising at least one anisotropic particle dispersed in a medium and thereafter freeze dried. Another embodiment relates to an article comprising an oriented anisotropic material and at least one matrix, wherein the oriented anisotropic material comprises a freeze dried anisotropic material.

40 Claims, 9 Drawing Sheets

OTHER PUBLICATIONS

K. Fujimoto, M. Yoshikawa, S. Katahira, K. Yasue, Kobunshi Robunshu, *Crystal Structure of Nylon 6/Inorganic Layered Silicate Nanocomposite Film*, 57(7), pp. 433-439 (2000).

A. Vaxman, M. Narkis, A. Siegmann, S. Kenig, *Fibre Orientation And Rheology In Short Fibre Reinforced Thermoplastics*, J. Materials Sci. Letters 7, pp. 25-30 (1988).

L.A. Goettler, *The Role Of The Polymer Matrix In The Processing And Structural Properties Of Composite Materials*, J.C. Seferis and L. Nicolais, eds. New York, Plenum, pp. 289-318, (1983).

S. Jin, T.H. Tiefel, R. Wolfe, *Directionally-Conductive, optically-Transparent Composites By Magnetic Alignment*, IEEE Transactions On Magnetics, vol. 28, (5, Pt. 2), pp. 2211-2213 (1992).

Japanese Patent Abstract 58 107181 A, Jun. 25, 1983.
Japanese Patent Abstract 05 127200 A, May 25, 1993.
Japanese Patent Abstract 08 092485 A, Apr. 9, 1996.
Japanese Patent Abstract 11 079860 A, Mar. 23, 1999.

* cited by examiner

MATERIAL, ARTICLE AND METHOD OF PREPARING MATERIALS CONTAINING ORIENTED ANISOTROPIC PARTICLES

FIELD OF THE INVENTION

The present invention relates to oriented anisotropic particles and a method for preparing materials and articles containing oriented anisotropic particles.

BACKGROUND OF THE INVENTION

Films, comprising anisotropic particles in a matrix resin, that are made by typical methods, such as by solvent casting or extrusion and biaxial orientation, result in the anisotropic particles being preferentially oriented parallel to the plane of the film. For this reason, properties such as modulus and electrical conductivity are typically higher in the plane of the film than in a direction perpendicular to the plane of the film. Composites Based on Micron-Sized Exfoliated Graphite Particles: Electrical Conduction, Critical Exponents and Anisotropy, A. Celzard, E. McRae, J. F. Mareche, G. Furdin, M. Dufort, and C. Deleuze, J. Phys. Chem. Solids Vol 57, pp. 715-718 (1996), Crystal Structure of Nylon 6/Inorganic Layered Silicate Composite Film, K. Fujimoto, M. Yoshikawa, S. Katahira, K. Yasue, Kobunshi Robunshu, 57(7), 433-439 (2000). Fiber Orientation and Rheology in Short Fiber Reinforced Thermoplastics, A. Vaxman, M. Narkis, A. Siegmann, S. Kenig, J. Materials Sci. Letters 7, 25-30 (1988), The Role of the Polymeric Matrix in the Processing and Structural Properties of Composite Materials, L. A. Goettler, (J. C. Seferis and L. Nicolais, eds.), New York, Plenum, 1983, pp. 289-318.

It is very difficult to prepare a film or article comprising anisotropic particles in a matrix resin in which the anisotropic particles are oriented perpendicular to the plane of the film. Typically, in order to do this, the film is fabricated under the influence of an externally applied magnetic or electric field while it is heated and cured. Such processes for producing anisotropic particle orientation perpendicular to the film plane are slow and cumbersome, are not easily done in continuous fashion, and do not lead to ease and efficiency of manufacturing, as described in Directionally-Conductive, Optically-Transparent Composites by Magnetic Alignment, S. Jin, T. H. Tiefel, R. Wolfe, IEEE Trans. Magn., 28(5, Pt. 2), 2211-13 (1992), Kokai Tokyo Koho JP 2002056719 A2 20020222, Japan, Kokai Tokkyo Koho JP 2001322139 A2 20011120, Japan, Kokai Tokkyo Koho JP 2001294676 A2 20011023, and Kokai Tokkyo Koho JP 2001335602 A2 20011204.

Polymeric films containing anisotropic particles that are oriented perpendicular to the plane of the film have among their desirable properties the fact that their thermal and electrical conductivities are higher in the direction perpendicular to the plane of the film than they are in the plane of the film. Such films have been reported to be useful as transparent visual sensors for visual communication devices, anisotropically pressure-dependent conductive sheets for electrical contacts, and thermally conductive adhesive films for bonding electronic components to the surfaces of heat sinks and thermal management devices, described in PCT Int. Appl. WO 9840431, Sep. 17, 1998.

This invention provides a desirable method for preparing oriented anisotropic particles, oriented anisotropic materials, and articles made therefrom.

SUMMARY OF THE INVENTION

The present invention relates to a method for preparing oriented anisotropic particles comprising the steps of providing at least one anisotropic particle, dispersing the one anisotropic particle(s) in a medium, and freeze drying the dispersion of anisotropic particle(s) and the medium. In another embodiment, the present invention relates to an oriented anisotropic material comprising at least one anisotropic particle dispersed in a medium and thereafter freeze dried. Another embodiment relates to an article comprising an oriented anisotropic material and at least one matrix, wherein the oriented anisotropic material comprises a freeze dried anisotropic material.

The present invention includes several advantages, not all of which may be incorporated an any single embodiment. The method for preparing oriented anisotropic particles, oriented anisotropic materials, and articles is simple and inexpensive. Materials prepared by this method may be utilized as is or further altered by mechanical breakup, by imbibition or absorption of a second material such as a hardenable resin to form a useful composite, or by incorporation into a film or multilayer film structure. Further, many materials described in this invention have been found to be fire retardant, retaining their shape even after being held above a Bunsen burner flame. Fibers prepared from such materials have flame retardant properties as well.

DETAILED DESCRIPTION OF THE INVENTION

Figure 1:
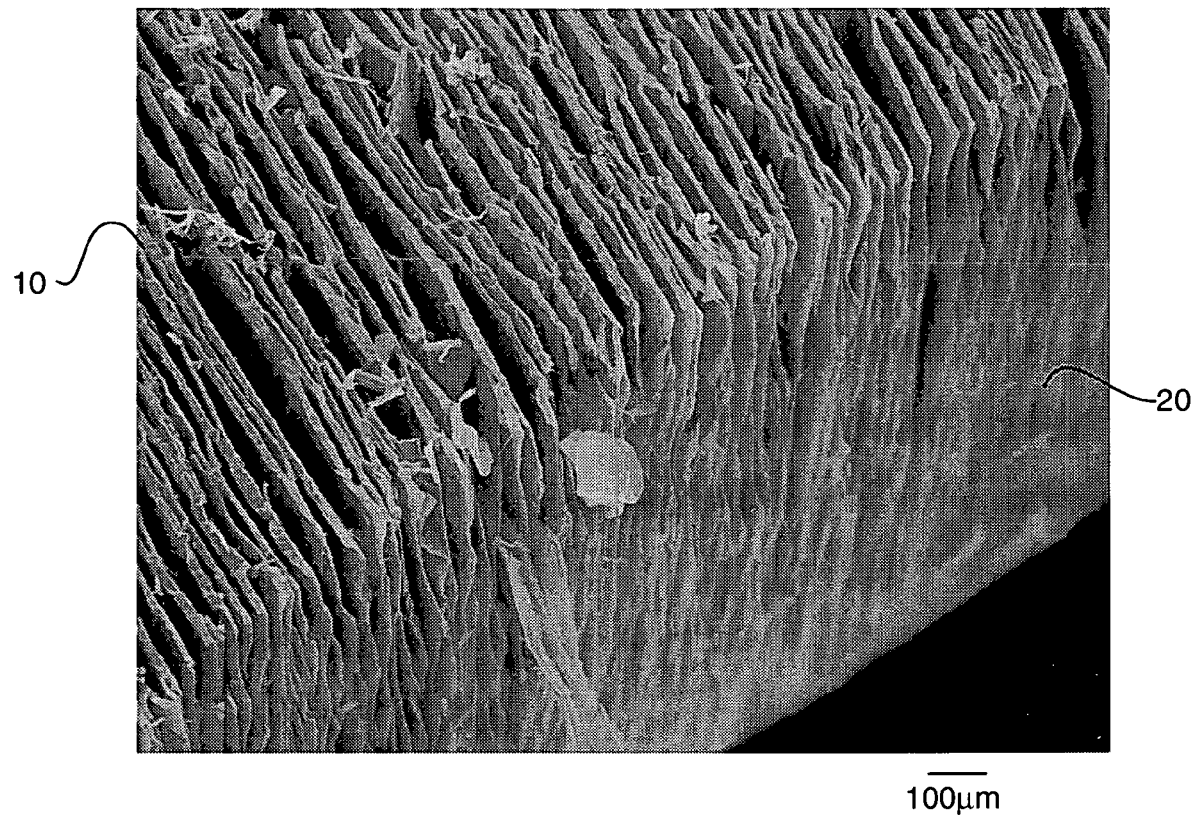
FIG. 1 is a scanning electron micrograph of a 75:25 Cloisite Na:AQ55 nanocomposite sample prepared in accordance with the invention. The surface grown parallel to the substrate is identified as 10, the surface grown perpendicular to the substrate is identified as 20.

Whenever used in the specification the terms set forth shall have the following meaning:

"Nanocomposite" shall mean a composite material wherein at least one component comprises an inorganic phase, such as a smectite clay, with at least one dimension in the 0.1 to 1000 nanometer range.

"Anisotropic particle" shall mean a particle where at least one of the dimensions of the particle is significantly larger than at least one other dimension of the particle.

"Plates" shall mean particles with two comparable dimensions significantly greater than the third dimension, e.g., length and width of the particle being of comparable size but orders of magnitude greater than the thickness of the particle.

"Layered material" shall mean an inorganic material such as a smectite clay that is in the form of a plurality of adjacent bound layers.

"Platelets" shall mean individual layers of the layered material.

"Intercalation" shall mean the insertion of one or more foreign molecules or parts of foreign molecules between platelets of the layered material, usually detected by X-ray diffraction technique, as illustrated in U.S. Pat. No. 5,891,611 (line 10, col.5-line 23, col. 7).

"Intercalant" shall mean the aforesaid foreign molecule inserted between platelets of the aforesaid layered material.

"Intercalated " shall refer to layered material that has at least partially undergone intercalation and/or exfoliation.

"Exfoliation" or "delamination" shall mean separation of individual platelets in to a disordered structure without any stacking order.

"(001) basal plane" shall refer to the spacing between a layer of silicate atoms in one plane to the corresponding layer of silicate atoms in another plane, including any material present between layers. This can also be referred to as basal plane spacing or d(001).

"Organoclay" shall mean clay material modified by organic molecules.

"Organically modified" shall mean the addition of an organic material or organic end group.

"Splayed" materials are defined as materials which are completely intercalated with no degree of exfoliation, totally exfoliated materials with no degree of intercalation, as well as layered materials which are both intercalated and exfoliated including disordered layered materials.

"Splaying" refers to the separation of the particles of a material, preferably a layered material, which may be to a degree, which still maintains a lattice-type arrangement, as in intercalation, or to a degree which spreads the lattice structure to the point of loss of lattice structure, as in exfoliation.

"Splayant" refers to a material or materials used to completely intercalate materials with no degree of exfoliation, totally exfoliate materials with no degree of intercalation, as well as separate or splay materials, both layered and non-layered, to result in a material which is both intercalated and exfoliated.

"Polymer" shall include oligomers, copolymers and interpolymers.

"Ionomers" are polymers in which the linkages are ionic as well as covalent bonds. There are positively and negatively charged groups that are associated with each other and this polar character makes a unique resin.

"Top" and "bottom" side of an imaging support shall refer to the side bearing the imaging layer(s) and the opposite side, respectively.

The present invention relates to oriented anisotropic particles or materials comprising anisotropic particles, dispersed in a medium and thereafter freeze dried. In a preferred embodiment, the particles are splayed prior to freeze drying. Anisotropic particles are characterized as having different properties in different directions, thus, crystals of the isometric system are optically isotropic, but all other crystals are anisotropic. Many materials may be anisotropic.

Some anisotropic particles that may be suitable for this use in this invention include anisotropic crystalline materials such as tabular silver halides and silver carboxylate salts, anisotropic semiconducting particles, organic crystalline or liquid crystalline needles and flakes, metal and metal oxide needles and flakes, organic and inorganic fibers, and anisotropic nanodevices, which are devices preferably smaller than 1 micron in at least one dimension.

The anisotropic materials most suitable for this invention include materials in the shape of plates with significantly high aspect ratio. However, other shapes with high aspect ratio will also be advantageous. Some particularly useful anisotropic materials suitable for this invention comprise clays or non-clays. These materials include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the layered materials named above. Other useful layered materials, particularly useful with anionic dispersing polymers, are the layered double hydroxide clays or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be splayed with swelling agents, which expand their interlayer spacing. Such materials include chlorides such as $FeCl_3$, FeOCl, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4-2H_2O$, $CaPO_4CH_3$—$H_2O$, $MnHAsO_4$—$H_2O$, $Ag_6Mo_{10}O_{33}$ and the like. Preferred layered materials are swellable so that other agents, usually organic ions or molecules, can intercalate and/or exfoliate the layered material resulting in a desirable dispersion of the inorganic phase. These swellable layered materials include phyllosilicates of the 2:1 type, as defined in the literature, for example, "An introduction to clay colloid chemistry," by H. van Olphen, John Wiley & Sons Publishers. Typical phyllosilicates with ion exchange capacity of 50 to 300 milliequivalents per 100 grams are preferred. Preferred layered materials for the present invention include clays, especially smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred layered materials include montmorillonite, hectorite and hydrotalcites, because of commercial availability of these materials.

The aforementioned layered materials can be natural or synthetic, for example, synthetic smectite layered materials. This distinction can influence the particle size and/or the level of associated impurities. Typically, synthetic layered materials are smaller in lateral dimension, and therefore possess smaller aspect ratio. However, synthetic layered materials are purer and are of narrower size distribution, compared to natural clays and may not require any further purification or separation. For this invention, the clay particles should have a lateral dimension of between 0.01 μm and 5 μm, and preferably between 0.05 μm and 2 μm, and more preferably between 0.1 μm and 1 μm. The thickness or the vertical dimension of the clay particles can vary between 0.5 nm and 10 nm, and preferably between 1 nm and 5 nm. The aspect ratio, which is the ratio of the largest and smallest dimension of the layered material particles should be >10:1 and preferably >100:1 and more preferably >1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment as well as the imaging layers.

The clay particles of the present invention may be dispersed in a suitable medium. The medium can comprise water, suitable organic solvent, dispersing polymers or mixtures thereof. For environmental reasons, aqueous media or dispersing polymers are more preferred.

In a preferred embodiment, the dispersing polymer of the invention can be any polymer but is preferred to be a polymer that can be dissolved in an aqueous or nonaqueous solvent and freeze dried. Preferred dispersing polymers include film-forming polymers, thermoplastic polymers, vulcanizable and thermoplastic rubbers and thermosetting polymers, because of their widespread use and effectiveness in the present invention.

The dispersing polymer in which the anisotropic particles are preferably dispersed can comprise a wide variety of polymers. Specifically, the dispersing polymer can comprise a water soluble polymer, hydrophilic colloid or water insoluble polymer, for application from an aqueous or organic solvent based coating composition. Alternatively, it can comprise thermally processable thermoplastic or thermosetting polymers.

The water soluble dispersing polymers can preferably comprise polyalkylene oxides such as polyethylene oxide, poly 6, (2-ethyloxazolines), poly(ethyleneimine), poly(vinylpyrrolidone), poly(vinyl alcohol), poly (vinyl acetate), polystyrene sulfonate, polyacrylamides, polymethacrylamide, poly(N,N-dimethacrylamide), poly(N-isopropylacrylamide), polysaccharides, dextrans or cellulose derivatives such as carboxymethyl cellulose, hydroxyethyl cellulose, and the like. Water soluble polymers provide the advantage of an environmentally attractive coating composition. Also, a number of these water soluble dispersing polymers can also intercalate clays, thus, providing a uniform dispersion.

The dispersing hydrophilic colloid can preferably comprise gelatin or gelatin grafted polymers. The aforementioned gelatin may comprise, for example, alkali-treated gelatin (cattle bone or hide gelatin), acid-treated gelatin (pigskin or bone gelatin), and gelatin derivatives such as partially phthalated gelatin, acetylated gelatin, and the like, and preferably the deionized gelatins. Gelatin and gelatin based polymers are particularly attractive because of their relatively low cost and ability to intercalate clays.

The water insoluble dispersing polymers can comprise polymers soluble in organic solvents or polymers in the form of aqueous dispersions or latexes. Such polymers can preferably comprise polymers of styrene and styrene derivatives, alkyl acrylate, alkyl methacrylate and their derivatives, olefins, acrylonitrile, acrylic acid, methacrylic acid, maleic acid, itaconic acid, vinyl acetate, vinyl halide, vinylidene halide, cellulose esters such as cellulose acetate and cellulose acetate butyrate, polyurethane, polyester and polyester ionomer. The aforesaid water insoluble polymers, can include thermally processable polymers, can provide useful physical properties, such as adhesion to adjacent layers, electrical conductivity, improved mechanical or optical properties, etc. A particularly suitable water dispersible polymer comprises polyester ionomer for its excellent film forming characteristics, compatibility with smectite clay and commercial availability.

The thermally processable dispersing polymer can be a thermoplastic or a thermosetting polymer. Thermosetting polymers provide an added advantage because they typically are good adhesives and therefore may stick well to a variety of core materials. Thermally processable polymeric materials can comprise polyester, polyolefin, polyurethane, polyamide, polyimide, polycarbonate, polystyrene, polymethyl methacrylate, cellulose esters, polyether, and polyvinyl alcohol. The addition of anisotropic particles to thermally processable polymers can significantly modify their physical properties as well as broaden their applications.

Illustrative of useful dispersing thermoplastic resins are polylactones such as poly(pivalolactone), poly(caprolactone) and the like, polyurethanes derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'diphenyl-methane diisocyanate, 3,3-'dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyanatodiphenylmethane and the like and linear long-chain diols such as poly(tetramethylene adipate), poly(ethylene adipate), poly(1,4-butylene adipate), poly(ethylene succinate), poly(2,3-butylenesuccinate), polyether diols and the like, polycarbonates such as poly(methane bis(4-phenyl) carbonate), poly(1,1-ether bis(4-phenyl) carbonate), poly(diphenylmethane bis(4-phenyl)carbonate), poly(1,1-cyclohexane bis(4-phenyl)carbonate), poly(2,2-bis-(4-hydroxyphenyl) propane) carbonate, and the like, polysulfones, polyether ether ketones, polyamides such as poly (4-amino butyric acid), poly(hexamethylene adipamide), poly(6-aminohexanoic acid), poly(m-xylylene adipamide), poly(p-xylene sebacamide), poly(2,2,2-trimethyl hexamethylene terephthalamide), poly(metaphenylene isophthalamide) (Nomex™), poly(p-phenylene terephthalamide)(Kevlar™), and the like, polyesters such as poly(ethylene azelate), poly(ethylene-1,5-naphthalate), poly(ethylene-2,6-naphthalate), poly(1,4-cyclohexane dimethylene terephthalate), poly(ethylene oxybenzoate) (A-Tell™), poly(para-hydroxy benzoate) (Ekonol™),poly(1,4-cyclohexylidene dimethylene terephthalate) (Kodel™) (cis), poly(1,4-cyclohexylidene dimethylene terephthalate) (Kodel™) (trans), polyethylene terephthlate, polybutylene terephthalate and the like, poly(arylene oxides) such as poly(2,6-dimethyl-1,4-phenylene oxide), poly(2,6-diphenyl-1,4-phenylene oxide) and the like, poly(arylene sulfides) such as poly(phenylene sulfide) and the like, polyetherimides, vinyl polymers and their copolymers such as polyvinyl acetate, polyvinyl alcohol, polyvinyl chloride, polyvinyl butyral, polyvinylidene chloride, ethylene-vinyl acetate copolymers, and the like, polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated budadiene-styrene copolymers and the like, polyolefins such as (linear) low and high density poly(ethylene), poly(propylene), chlorinated low density poly(ethylene), poly(4-methyl-1-pentene), poly(ethylene), poly(styrene), and the like, ionomers, poly(epichlorohydrins), poly(urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicycohexylmethane diisocyanate and the like, and polysulfones such as the reaction product of the sodium salt of 2,2-bis(4-hydroxyphenyl) propane and 4,4'-dichlorodiphenyl sulfone, furan resins such as poly(furan), cellulose ester plastics such as cellulose acetate, cellulose acetate butyrate, cellulose propionate and the like, silicones such as poly(dimethyl siloxane), poly(dimethyl siloxane), poly(dimethyl siloxane co-phenylmethyl siloxane), and the like, protein plastics, polyethers, polyimides, polyvinylidene halides, polycarbonates, polyphenylenesulfides, polytetrafluoroethylene, polyacetals, polysulfonates, polyester ionomers, polyolefin ionomers. Copolymers and/or mixtures of these aforementioned polymers can also be used.

Another group of materials useful as dispersing polymers is radiation curable polymers. These polymers may be selected from the group of those containing an acrylate, epoxy and isobutylene moiety. Radiation curable materials provide excellent adhesion between materials and are easily coated and cured. These materials are also very durable when cured and are able to withstand a range of temperatures and humidity.

Preferred dispersing polyamides for use in the practice of this invention include poly(caprolactam), poly(12-aminododecanoic acid), poly(hexamethylene adipamide), poly(m-xylylene adipamide), and poly(6-aminohexanoic acid) and copolymers and/or mixtures thereof, for their widespread application and effectiveness in the present invention.

Preferred dispersing polyesters for use in the practice of this invention include poly(ethylene terephthalate), poly(butylene terephthalate), poly(1,4-cyclohexylene dimethylene terephthalate) and poly(ethylene naphthalate) and copolymers and/or mixtures thereof. Among these polyesters of choice, poly(ethylene terephthalate) is most preferred, because of its excellent mechanical strength, manufacturability, and effectiveness in the present invention.

Another set of useful thermoplastic dispersing polymers are formed by polymerization of alpha-beta-unsaturated monomers of the formula:

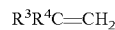

$$R^3R^4C=CH_2$$

wherein: $R^3$ and $R^4$ are the same or different and are cyano, phenyl, carboxy, alkylester, halo, alkyl, alkyl substituted with one or more chloro or fluoro, or hydrogen. Illustrative of such preferred polymers include polymers of ethylene, propylene, hexene, butene, octene, vinylalcohol, acrylonitrile, vinylidene halide, salts of acrylic acid, salts of methacrylic acid, tetrafluoroethylene, chlorotrifluoroethylene, vinyl chloride, styrene and the like. Copolymers and/or mixtures of these aforementioned polymers can also be used in the present invention.

Preferred thermoplastic dispersing polymers formed by polymerization of alpha-beta-unsaturated monomers for use in the practice of this invention are poly(propylene), poly(ethylene), poly(styrene) and copolymers and/or mixtures thereof, with poly(propylene) polymers and copolymers being most preferred for their low cost and good mechanical and surface properties.

Other dispersing polymers that may be employed in the process of this invention are linear polyimides, as disclosed, for example, in U.S. Pat. No. 5,216,118 by Perry, Turner, and Blevins. The type of polyimide is not critical and the particular polyimides chosen for use in any particular situation will depend essentially on their physical properties and features, i.e., tensile strength, modulus and the like, and optical and electrical properties, desired in the final form. Thus, a multiplicity of linear polyimides having wide variations in physical properties is suitable for use in the process of this invention.

Vulcanizable and thermoplastic rubbers useful as dispersing polymers in the practice of this invention may also vary widely. Illustrative of such rubbers are brominated butyl rubber, chlorinated butyl rubber, polyurethane elastomers, fluoroelastomers, polyester elastomers, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyester and the like and the elastomeric blocks such as poly(butadiene), poly(isoprene), ethylene-propylene copolymers, ethylene-butylene copolymers, polyether ester and the like as for example the copolymers in poly(styrene)-poly(butadiene)-poly(styrene) block copolymer manufactured by Shell Chemical Company under the trade name of Kraton™ Copolymers and/or mixtures of these aforementioned polymers can also be used. Preferred dispersing polymers for the present invention are thermoplastic polymers such as polyamides, polyesters, and polymers of alpha-beta unsaturated monomers and copolymers.

In a preferred embodiment, the polymer used in the present invention may intercalate the anisotropic particles. These intercalants are typically organic compounds, which are neutral or ionic. Useful neutral organic molecules include polar molecules such as amides, esters, lactams, nitrites, ureas, carbonates, phosphates, phosphonates, sulfates, sulfonates, nitro compounds, and the like.

The neutral organic intercalants can be monomeric, oligomeric or polymeric. Neutral organic molecules can cause intercalation in the layers of the clay through hydrogen bonding, without completely replacing the original charge balancing ions. Useful ionic compounds are cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays are available from clay vendors, which may be used in the practice of this invention.

In a preferred embodiment of the invention, the clay particles are preferably splayed by the dispersing polymer. Any of the dispersing polymers discussed herein above can be selected for this purpose. Particularly suitable dispersing polymers are water soluble polymers, hydrophilic colloids and water insoluble polymer latexes or dispersions.

The clay particles and the dispersing polymer can be interacted in a suitable medium in which the clay particles are dispersed and the dispersing polymer is also dispersed or dissolved. The aforesaid medium can comprise water or any suitable organic solvent or mixtures of both. For environmental reasons, aqueous media are more preferred.

The anisotropic particle of the invention can be incorporated in any article. Such an article may be of any size and form, such as sheet, rod, fiber, wire, tube, granules, powder, woven, non-woven, support, layer in a multilayer structure, and the like. The article of the invention can be used for any purpose such as packaging, woven or non-woven products, protective sheets or clothing, medical implement, electronic, optical, or optoelectronic devices, display films, acoustic materials and devices, electromagnetic materials or devices, photovoltaic devices, image forming elements, ink jet receiving media, or flame retardant fibers and materials.

The present invention also relates to an article comprising an oriented anisotropic material and at least one matrix, wherein said oriented anisotropic material comprises a freeze dried anisotropic material.

The matrix may include inorganic or organic materials, including polymers. The matrix polymer can be the same as the splayant, or it can differ.

If the matrix polymer is different from the splayant, as in one embodiment of the invention, care should be taken to ensure compatibility between the matrix polymer and the splayant. If the matrix polymer comprises a blend of polymers, at least one of the polymers in the blend should be compatible with the splayant. If the matrix polymer comprises block copolymer(s), at least one of the blocks of the copolymer(s) should be compatible with the splayant.

Polymeric film-forming matrix polymers, also referred to as binders, which may be useful in this invention include the aforementioned water soluble polymers, hydrophilic colloids, water insoluble polymers, thermally processable polymers, and radiation curable polymers as well as thermoplastic polymers, polyamides, polyesters, and polyimides whose compositions are illustrated below.

The article of the invention can be formed by any method known in the art. Such methods of formation include but are not limited to extrusion, co-extrusion with or without orientation by uniaxial or biaxial, simultaneous or consecutive stretching, lamination, casting, coating, spraying, drawing, spinning, weaving, grinding and the like.

In one preferred embodiment of the invention, the article of the invention comprises a layer of an ink jet imaging media. In a more preferred embodiment of the invention, the article of the invention comprises the ink receiving layer of a fast-drying ink jet media, such as paper, plastic, or other display products, in which the ink is channeled perpendicular to the film without substantial image spread or coalescence. In this preferred embodiment, the anisotropic particles of the invention are coated and freeze dried onto an imaging base.

Typical bases for imaging members comprise cellulose nitrate, cellulose acetate, poly(vinyl acetate), polystyrene, polyolefins, poly(ethylene terephthalate), poly(ethylene naphthalate), polycarbonate, polyamide, polyimide, glass, natural and synthetic paper, resin-coated paper, voided polymers, microvoided polymers and microporous materials, fabric, etc. The material of the invention comprising a matrix polymer, splayant, and the intercalated clay can be incorporated into the imaging media by coating and freeze drying. In case of a multilayered imaging member, the aforementioned material of the invention can be incorporated in any one or more layers, and can be placed anywhere in the imaging support, e.g., on the topside, or the bottom side, or both sides, and/or in between the two sides of the support. The method of incorporation can include casting, co-casting, lamination, calendering, embossing, coating, spraying, and the like. The image or ink receiving layer may be placed on either side or both sides of the imaging support.

In yet another embodiment, a composition comprising a matrix polymer and the intercalated clay of the invention can be coated and freeze dried into a preformed sheet and subsequently laminated to another support, as in the formation of typical laminated reflective print media.

In a preferred embodiment, the material of this invention is incorporated in imaging media used for image display such as reflective print media including papers, particularly resin-coated papers, voided polymers, and combinations thereof. Alternatively, the imaging support may comprise a combination of a reflective medium and a transparent medium, in order to realize special effects, such as day and night display. In a preferred embodiment, at least one layer comprising the material of the present invention is incorporated in a support comprising paper, because of its widespread use. In another preferred embodiment, at least one layer comprising the nanocomposite of the present invention is incorporated in an imaging support comprising a voided polymer, because of its many desirable properties such as tear resistance, smoothness, improved reflectivity, metallic sheen, day and night display usage.

The imaging media of the invention can comprise any number of auxiliary layers. Such auxiliary layers may include antistatic layers, back mark retention layers, tie layers or adhesion promoting layers, abrasion resistant layers, conveyance layers, barrier layers, splice providing layers, UV absorption layers, antihalation layers, optical effect providing layers, waterproofing layers, and the like.

The present invention may be utilized in various imaging elements. Some of these elements may comprise dyes. The dyes used in this invention can be either water-soluble or water insoluble. Examples of a water soluble dye includes a reactive dye, direct dye, anionic dye, acid dye, basic dye, mono- or poly-azo dye, phthalocyanine dye, methine or polymethine dye, merocyanine dye, azamethine dye, azine dye, quinophthalone dye, thiazine dye, oxazine dye, anthraquinone or a metal-complex dye, or dyes as disclosed in U.S. Pat. No. 5,973,026, the disclosure of which is hereby incorporated by reference. In a preferred embodiment of the invention the water-soluble dye may be a cationic or an anionic dye.

In a preferred embodiment of the invention, cationic dyes are used such as azo dyes, e.g., quaternized pyrazoleazoaniline dyes as disclosed in U.S. patent application Ser. No. 09/643,281, filed Aug. 22, 2000, triarylmethine dyes, azine dyes, phthalocyanine dyes, oxazine dyes or thiazine dyes.

In another preferred embodiment of the invention, anionic dyes which may be used include a mono or poly azo dye, such as a pyrazoleazoindole dye as disclosed in U.S. patent application Ser. No. 09/689,184 filed Oct. 12, 2000, a metal-complex dyes, such as transition metal complexes as disclosed in U.S. Pat. Nos. 5,997,622 and 6,001,161, i.e., a transition metal complex of an 8-heterocyclylazo-5-hydroxyquinoline, phthalocyanine dyes such as C.I. Direct Blue 199, anthraquinone dyes, or anthrapyridone dyes.

The water insoluble dyes used in this invention can be any dyes that are insoluble but dispersible in water as disclosed in U.S. patent application Ser. No. 09/510,879, filed Feb. 23, 2000. In another preferred embodiment of the invention, the water insoluble dyes can be salt-type dyes as disclosed in U.S. patent application Ser. No. 09/709,078, filed Nov. 10, 2000.

In another embodiment of the invention, a medium or device containing oriented anisotropic particles is fabricated in which the anisotropic oriented particles are nanoparticles, nanochips, nanodevices, or other nanoarticles. In one preferred embodiment, the nanoparticles, nanochips, nanodevices, or other nanoarticles are less than 1 micron in at least one dimension. In another embodiment of the invention, an electronic or optoelectronic device containing oriented anisotropic particles is fabricated in which the anisotropic oriented particle may be a solid-state chip, a laser, a ferroelectric or piezoelectric crystal or device, a nonlinear optic material or device, a photovoltaic element or device, or other electronic or optoelectronic element. In another embodiment of the invention, an active display medium or device containing oriented anisotropic particles is fabricated in which the anisotropic oriented particles or interstices between them serve as display elements. In another embodiment of the invention, an acoustic medium or device containing oriented anisotropic particles is fabricated in which the anisotropic oriented particles are either acoustic absorbers or emitters. In another embodiment of the invention, a dielectric or electromagnetic material or device containing oriented anisotropic particles is fabricated in which the anisotropic oriented particles or interstices between them serve as electromagnetic emitters or absorbers (stealth technology). In another embodiment of the invention, an image forming medium containing oriented anisotropic particles is fabricated in which the anisotropic oriented particles or interstices between them serve as image capture pixels. In another embodiment of the invention, a device or medium containing oriented anisotropic particles is fabricated in which the interstices between the anisotropic oriented particles are filled with a hardenable liquid or resin to form a composite.

The material and article of the present invention are prepared utilizing a freeze drying methodology. In one preferred method, oriented anisotropic particles may be prepared by providing at least one anisotropic particle, dispersing the particle in a medium, followed by freeze drying of the dispersion. In another embodiment, oriented anisotropic particles may be prepared by dispersing the anisotropic particle (s) with a dispersion of a polymer to splay the particle, followed by freeze drying the dispersed mixture.

Freeze drying, or lyophilization, is a technique familiar to those skilled in the art of materials science and chemistry. Two steps are involved. First a solution or dispersion is frozen to a solid state. Then the vessel containing the liquid is either connected to or placed within a vacuum chamber while being kept frozen, and the volatile portion of the frozen liquid is sublimed and removed, leaving behind a dry solid.

In one particularly preferred embodiment of the invention, the preferred clay particles are first dispersed in an aqueous medium with high shear. The solid content of such dispersion should be $\leq 30\%$, preferably $\leq 10\%$ and more preferably $\leq 3\%$ to achieve at least partial exfoliation. Shearing of the dispersion should be continued for at least 4 hours and preferably at least 12 hours and more preferably at least 24 hours. An aqueous solution and/or dispersion of the splayants, which is preferably the dispersing polymer itself, is separately prepared. The solids content of this latter solution/dispersion is preferably kept similar to that of the clay particles. In the next step the two components, namely the clay dispersion and the splayant solution/dispersion are combined. The combination is stirred for at least 4 hours and preferably at least 12 hours and more preferably at least 24 hours. In case the splayant is different from the dispersing polymer, a separate solution and/or dispersion of the dispersing polymer, is prepared similar to that of the splayant, and is added to the clay and splayant combination. Any optional addenda described subsequently, can be incorporated in this composition. The final composition is stirred for at least 4 hours and preferably at least 12 hours and more preferably at least 24 hours.

The weight ratio of the clay: medium can vary from 0.1:99.9 to 50:50. However it is preferred to be between 0.1:99.9 to 30:70 and more preferred to be between 0.1:99.9 to 20:80 and most preferred between 0.1:99.9 to 10:90 in order to optimize the desirable physical properties of article and the intercalation afforded by splayant and/or the matrix polymer.

The weight ratio of the clay: dispersing polymer can vary from 1:99 to 99:1. However it is preferred to be between 1:99 and 90:10 and more preferred to be between 1:99 and 80:20 and most preferred between 1:99 and 70:30 in order to optimize the desirable physical properties of article and the intercalation afforded by splayant and/or the matrix polymer. For example, the weight ratio of clay to dispersing polymer for use as a master batch would be varied to include more clay. In addition, higher weight ratios of layered material may improve or increase the amount of anisotropy.

Although the aforesaid preferred embodiment is expected to provide the best results, any other method of combining the clay, splayant, matrix polymer and optional addenda may be followed to accommodate processing need or constraint. Similarly, the time of mixing can be altered to hasten the process. Although the preferred medium is aqueous, any other organic solvent based medium can also be used in the final composition.

In the present invention, the final composition is subjected to freeze drying for removal of the medium. An example of a freeze drying apparatus used for the experiments detailed below is a Virtis Freezemobile 25ES with a Unitop 600L unit.

Conditions for freeze drying, such as residence time, temperature, and vacuum, can be easily changed by changing apparatus settings. Similar machines are also provided by other manufacturers.

In yet another embodiment of the invention, the clay, the splayant and/or the matrix polymer together with any optional addenda are combined in an aqueous or nonaqueous solvent phase in a manner described herein above, and then cast upon a substrate such as a tray or flat film or solid substrate, followed by solvent removal through freeze drying In yet another embodiment of the invention, the clay, the splayant, and/or the matrix polymer together with any optional addenda are combined in an aqueous or nonaqueous solvent phase, and then cast upon a continuous web of flat film or solid substrate, followed by continuous solvent removal through freeze drying, followed by winding or sheeting of the web.

The optional addenda mentioned herein above can include nucleating agents, surfactants, fillers, plasticizers, impact modifiers, chain extenders, colorants, lubricants, antistatic agents, pigments such as titanium oxide, zinc oxide, talc, calcium carbonate, etc., dispersants such as fatty amides, (e.g., stearamide), metallic salts of fatty acids, e.g., zinc stearate, magnesium stearate, etc., dyes such as ultramarine blue, cobalt violet, etc., antioxidants, fluorescent whiteners, ultraviolet absorbers, fire retardants, roughening agents, cross linking agents, and the like. These optional addenda and their corresponding amounts can be chosen according to need.

The following examples are provided to illustrate the invention.

Measurements

Assessment of orientation of anisotropic particles was carried out using X-ray diffraction. All data were collected using a Rigaku D2000 Bragg-Brentano diffractometer, equipped with a copper rotating anode, diffracted beam monochromator, and scintillation detector. Orientation of anisotropic particles leads to preferred orientation or alignment of lattice planes in crystalline materials. By comparing the relative intensities of two diffraction peaks in a diffraction pattern, for a specified orientation of a sample in the X-ray diffractometer, a lattice plane anisotropy value (anisotropy factor) can be determined. For Cloisite Na:Polymer, Cloisite Na, or Laponite the formula is defined as {Perpendicular $I_{(001)}/I_{(hk0)}$}/ {Parallel $I_{(001)}/I_{(hk0)}$} where $I_{(001)}$ is the intensity for the Cloisite Na clay or Laponite clay (001) diffraction peak typically found in the 2θ range of 1.5-9.5° 2θ, $I_{(hk0)}$ is the intensity for the clay diffraction peak observed at ~20° 2θ, $I_{(001)}/I_{(hk0)}$ is the ratio of these two clay peaks for a given orientation, Perpendicular represents orientation perpendicular to the substrate surface and Parallel represents orientation parallel to the substrate surface. This formula works for unintercalated and intercalated clay. For tabular AgBr:Polymer, the difference in the AgBr crystal structure, when compared to clay, produces a different diffraction pattern than seen in clay containing samples, thus requiring the selection of different diffraction peaks. For tabular AgBr:Polymer the formula is defined as {Perpendicular $I_{(200)}/I_{(111)}$}/{Parallel $I_{(200)}/I_{(111)}$} where $I_{(200)}$ is the AgBr (200) diffraction peak observed at ~30.9° 2θ, $I_{(111)}$ is the intensity for AgBr (111) diffraction peak observed at ~26.7° 2θ, $I_{(200)}/I_{(111)}$ is the ratio of these two AgBr peaks for a given orientation, Perpendicular represents orientation perpendicular to the substrate surface and Parallel represents orientation parallel to the substrate surface. This formula works for other materials, with the only modification being the selection of appropriate lattice planes to evaluate for intensity based on diffraction peak positions observed in the diffraction pattern. An anisotropy factor value near 1 (one) (is an indication that a sample has near random lattice plane orientation consistent with a sample that lacks orientation anisotropy. Fluctuations in X-ray beam intensity from an X-ray source, along with sample preparation and placement in the diffractometer can give rise to small variations in the anisotropy factor value, which can result in anisotropy factors in the range of 0.8 to 1.2 for a randomly oriented sample. For the formulas utilized here, a lattice plane anisotropy value greater than 1.2 can be considered a good measure of anisotropic orientation of particles as described in this invention. An anisotropy value less than 0.8 can be considered a good measure of conventional oriented alignment of particles.

In some layered materials such as smectite clay, it is possible that in some polymer matrices the clay may exist in an exfoliated state, resulting in a loss of clay diffraction peaks in the nanocomposite. Anisotropic amorphous particles may also be used in a nanocomposite and will lack observable diffraction peaks. These nanocomposites can still comprise anisotropically aligned particles. Transmission electron microscopy (TEM) can be used to confirm the anisotropic alignment of exfoliated platelets and amorphous particles.

EXAMPLE 1

Clay Particles in AQ55

An aqueous dispersion of Cloisite Na, a commercial grade montmorillonite clay, provided by Southern Clay Products is prepared at 2 weight % solid content. To this clay dispersion is added a 2% aqueous dispersion of AQ55, a polyester ionomer, supplied by Eastman Chemicals. The clay:polymer weight ratio in the final composition is maintained at 75:25. It is to be noted that AQ55, is known to intercalate clay as reported in U.S. Pat. Nos. 5,891,611, and 5,981,126. The final composition is stirred for at least 12 hours followed by freeze drying in a Virtis Freezemobile 25ES with a Unitop 600L unit.

Figure 2A:
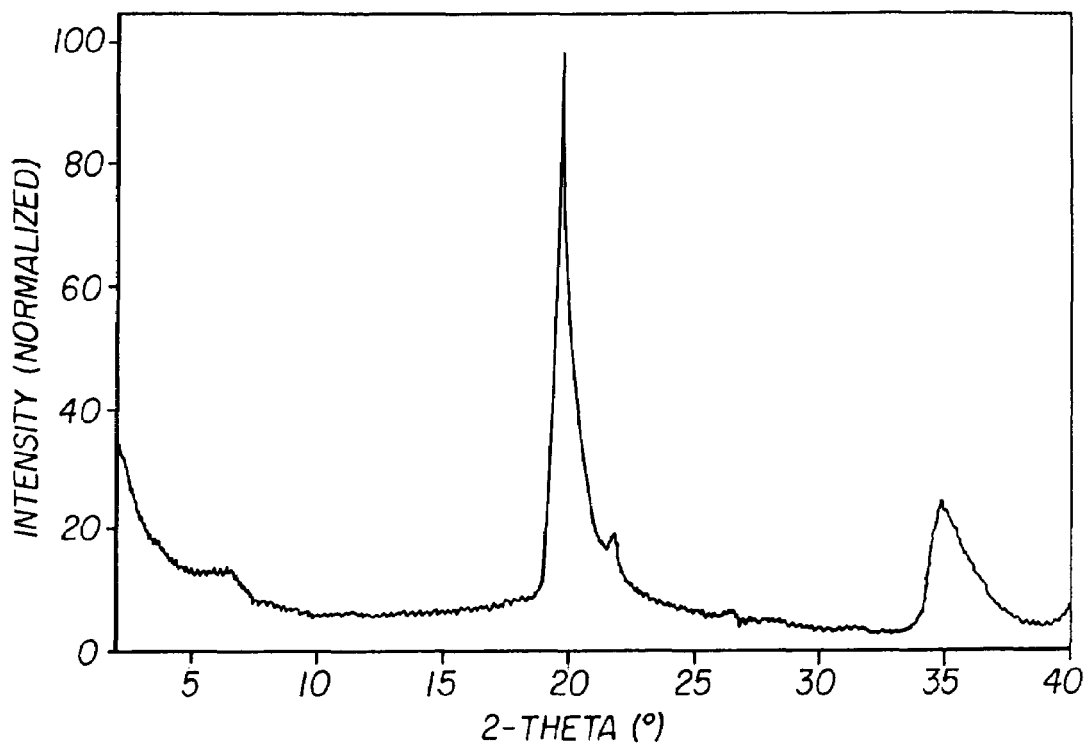
FIGS. 2a and 2b are the reflection mode X-ray diffraction data for a 75:25 Cloisite Na:AQ55 nanocomposite sample prepared in accordance with the invention, where (a) the surface grown parallel to the substrate is irradiated by the incident X-ray beam and (b) the surface grown perpendicular to the substrate is irradiated by the incident X-ray beam.

A scanning electron micrograph from the resultant nanocomposite material, prepared in accordance with the invention, is provided in FIG. 1. The sheets, composed of clay: polymer nanocomposite, are oriented perpendicular to the substrate upon which freeze drying is carried out. In each such sheet, the (001) plane of the clay particles lies in the plane of the sheet. Reflection mode X-ray diffraction patterns are recorded for the clay:polymer nanocomposite from two different sample orientations. In FIG. 2a, data are collected with the surface grown parallel to the substrate illuminated by the incident X-ray beam and in FIG. 2b, data are collected with the surface grown perpendicular to the substrate illuminated by the incident X-ray beam. From the relative difference in peak height intensity of diffraction peaks observed in FIG. 2a compared to FIG. 2b, it is evident that the clay platelets show anisotropic alignment. The observation that the relative intensity of the diffraction peaks changes with sample orientation in the X-ray beam is evidence of anisotropic alignment of the clay in the nanocomposite as prepared in accordance with the invention. Specifically, the (001) basal plane of the clay particles preferentially lies in the plane of the nanocomposite sheet, indicating that the (hk0) planes preferentially lie parallel to the substrate and (001) planes preferentially lie perpendicular to the substrate.

Figure 2B:
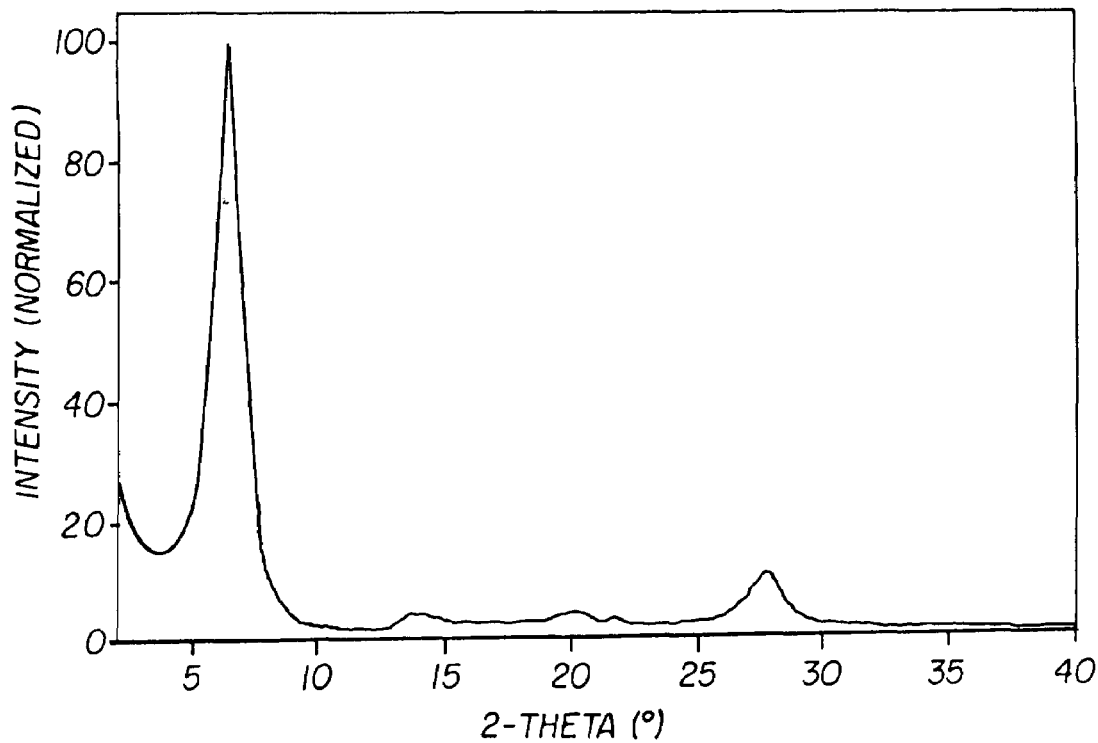

The lattice plane anisotropy was assessed using peak height intensities for the (001) and (hk0) diffraction peaks measured from FIGS. 2a and 2b, with results shown in Table 1.

TABLE 1

Lattice plane anisotropy for sample prepared in Example 1

| Sample orientation | (001) peak intensity, $I_{(001)}$ | (hk0) peak intensity, $I_{(hk0)}$ | $I_{(001)}/I_{(hk0)}$ | {Perpendicular $I_{(001)}/I_{(hk0)}$}/ {Parallel $I_{(001)}/I_{(hk0)}$} anisotropy factor |
|---|---|---|---|---|
| 2a—parallel | 100 | 3836 | 0.03 | |
| 2b—perpendicular | 20351 | 403 | 50.50 | |
| | | | | 50.50/0.03 = 1683.33 |

Anisotropic orientation of the clay particles perpendicular to the substrate in Example 1 is demonstrated by the {Perpendicular $I_{(001)}/I_{(hk0)}$}/{Parallel $I_{(001)}/I_{(hk0)}$} anisotropy factor greater than 1.2.

EXAMPLE 2

Clay Particles in AQ55

Figure 3A:
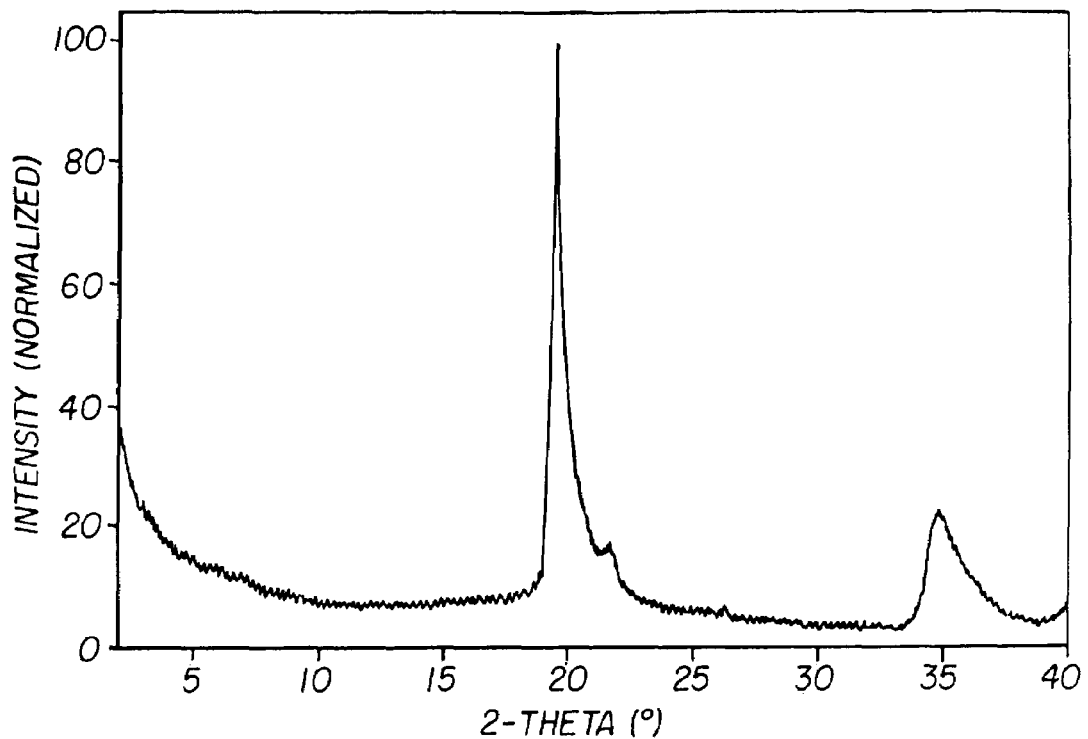
FIGS. 3a and 3b are the reflection mode X-ray diffraction data for a 50:50 Cloisite Na:AQ55 nanocomposite sample prepared in accordance with the invention, where (a) the surface grown parallel to the substrate is irradiated by the incident X-ray beam and (b) the surface grown perpendicular to the substrate is irradiated by the incident X-ray beam.

An aqueous dispersion of Cloisite Na, a commercial grade montmorillonite clay, provided by Southern Clay Products is prepared at 2 weight % solid content. To this clay dispersion is added a 2% aqueous dispersion of AQ55, a polyester ionomer, supplied by Eastman Chemicals. The clay:polymer weight ratio in the final composition is maintained at 50:50. It is to be noted that AQ55, is known to intercalate clay as reported in U.S. Pat. Nos. 5,891,611, and 5,981,126. The final composition is stirred for at least 12 hours followed by freeze drying in a Virtis Freezemobile 25ES with a Unitop 600L unit. X-ray diffraction patterns are recorded for the clay:polymer nanocomposite from two different sample orientations. In FIG. 3a, data are collected with the surface grown parallel to the substrate illuminated by the incident X-ray beam and in FIG. 3b, data are collected with the surface grown perpendicular to the substrate illuminated by the incident X-ray beam. From the relative difference in peak height intensity of diffraction peaks observed in FIG. 3a compared to FIG. 3b, it is evident that the clay platelets show anisotropic alignment. The observation that the relative intensity of the diffraction peaks changes with sample orientation in the X-ray beam is evidence of anisotropic alignment of the clay in the nanocomposite as prepared in accordance with the invention. Specifically, the (001) basal plane of the clay particles preferentially lies in the plane of the nanocomposite sheet, indicating that the (hk0) planes preferentially lie parallel to the substrate and (001) planes preferentially lie perpendicular to the substrate.

Figure 3B:
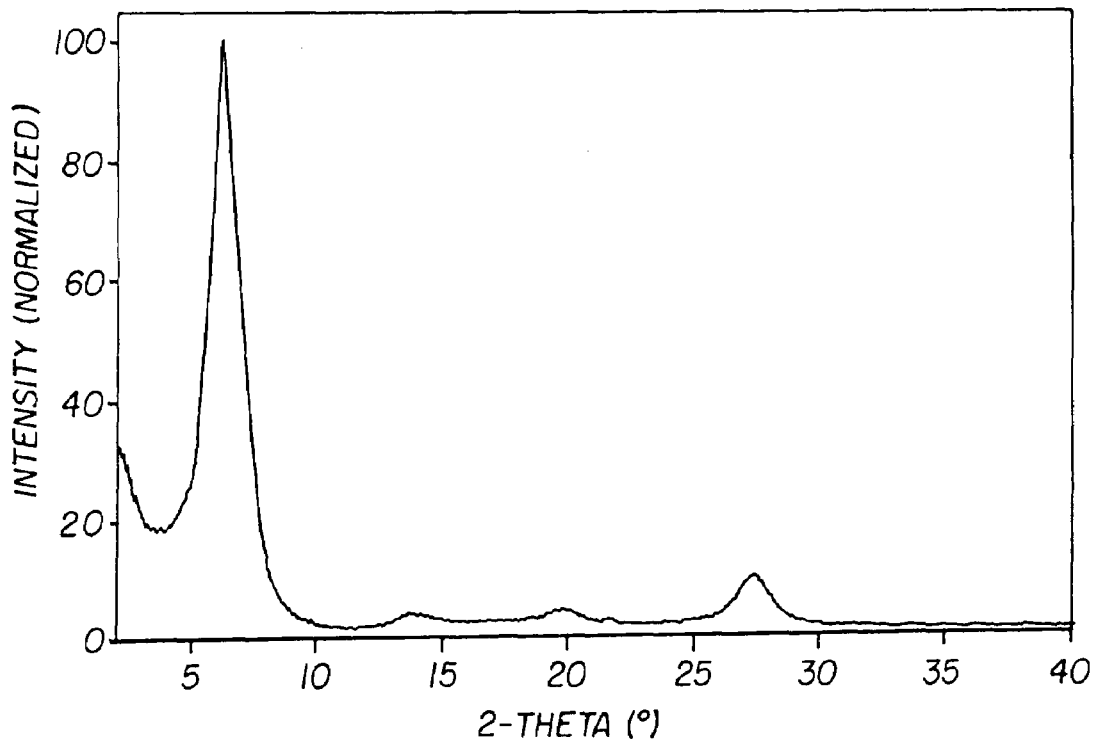

The lattice plane anisotropy was assessed using peak height intensities for the (001) and (hk0) diffraction peaks measured from FIGS. 3a and 3b, with results shown in Table 2.

TABLE 2

Lattice plane anisotropy for sample prepared in Example 2

| Sample orientation | (001) peak intensity, $I_{(001)}$ | (hk0) peak intensity, $I_{(hk0)}$ | $I_{(001)}/I_{(hk0)}$ | {Perpendicular $I_{(001)}/I_{(hk0)}$}/ {Parallel $I_{(001)}/I_{(hk0)}$} anisotropy factor |
|---|---|---|---|---|
| 3a—parallel | 22 | 4714 | 0.01 | |
| 3b—perpendicular | 20048 | 508 | 39.47 | |
| | | | | 39.47/0.01 = 3947.00 |

Anisotropic orientation of the clay particles perpendicular to the substrate in Example 2 is demonstrated by the {Perpendicular $I_{(001)}/I_{(hk0)}$}/{Parallel $I_{(001)}/I_{(hk0)}$} anisotropy factor greater than 1.2.

EXAMPLE 3

Clay Particles in AQ55

An aqueous dispersion of Cloisite Na, a commercial grade montmorillonite clay, provided by Southern Clay Products is prepared at 2 weight % solid content. To this clay dispersion is added a 2% aqueous dispersion of AQ55, a polyester ionomer, supplied by Eastman Chemicals. The clay:polymer weight ratio in the final composition is maintained at 25:75. It is to be noted that AQ55, is known to intercalate clay as reported in U.S. Pat. Nos. 5,891,611, and 5,981,126. The final composition is stirred for at least 12 hours followed by freeze drying in a Virtis Freezemobile 25ES with a Unitop 600L unit.

Figure 4A:
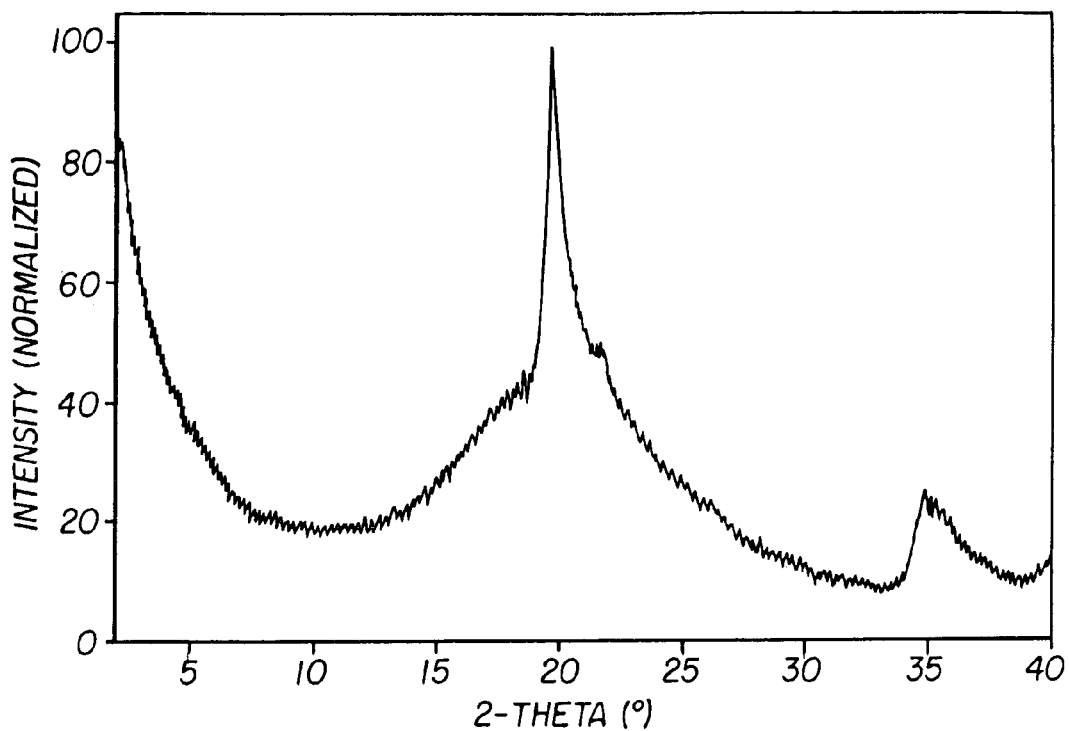
FIGS. 4a and 4b are the reflection mode X-ray diffraction data for a 25:75 Cloisite Na:AQ55 nanocomposite sample prepared in accordance with the invention, where (a) the surface grown parallel to the substrate is irradiated by the incident X-ray beam and (b) the surface grown perpendicular to the substrate is irradiated by the incident X-ray beam.

X-ray diffraction patterns are recorded for the clay:polymer nanocomposite from two different sample orientations. In FIG. 4a, data are collected with the surface grown parallel to the substrate illuminated by the incident X-ray beam and in FIG. 4b, data are collected with the surface grown perpendicular to the substrate illuminated by the incident X-ray beam. From the relative difference in peak height intensity of diffraction peaks observed in FIG. 4a compared to FIG. 4b, it is evident that the clay platelets show anisotropic alignment. The observation that the relative intensity of the diffraction peaks changes with sample orientation in the X-ray beam is evidence of anisotropic alignment of the clay in the nanocomposite as prepared in accordance with the invention. Specifically, the (001) basal plane of the clay particles preferentially lies in the plane of the nanocomposite sheet, indicating that the (hk0) planes preferentially lie parallel to the substrate and (001) planes preferentially lie perpendicular to the substrate.

Figure 4B:
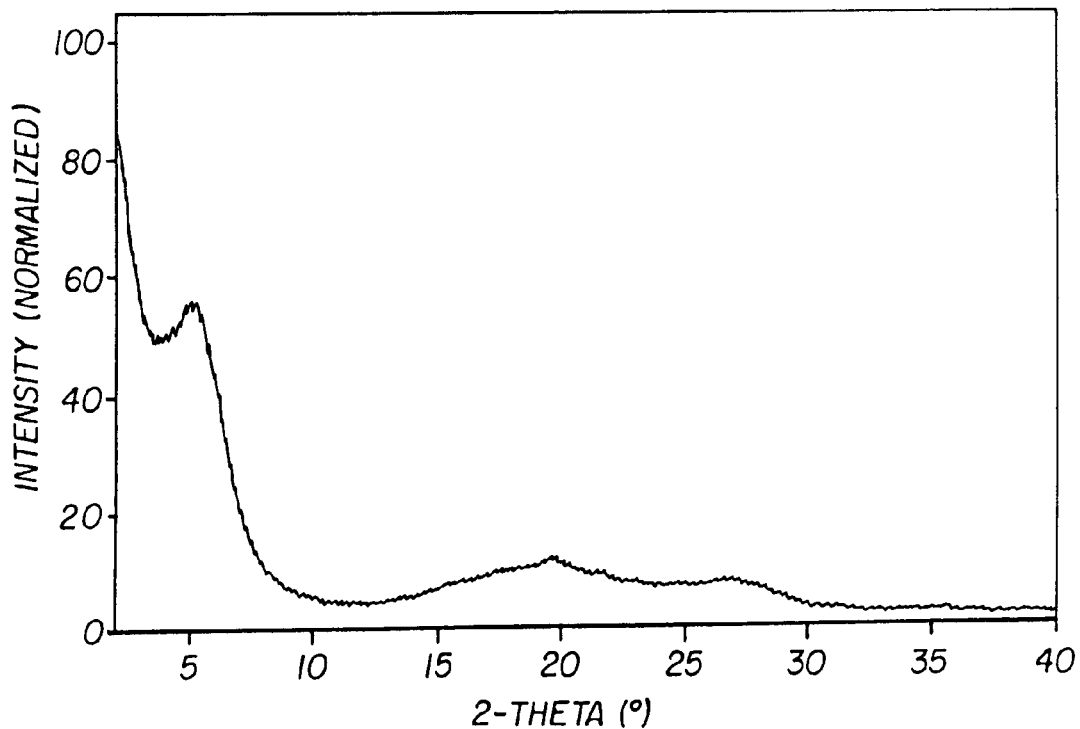

The lattice plane anisotropy was assessed using peak height intensities for the (001) and (hk0) diffraction peaks measured from FIGS. 4a and 4b, with results shown in Table 3.

TABLE 3

Lattice plane anisotropy for sample prepared in Example 3

| Sample orientation | (001) peak intensity, $I_{(001)}$ | (hk0) peak intensity, $I_{(hk0)}$ | $I_{(001)}/I_{(hk0)}$ | {Perpendicular $I_{(001)}/I_{(hk0)}$}/ {Parallel $I_{(001)}/I_{(hk0)}$} anisotropy factor |
|---|---|---|---|---|
| 4a—parallel | 12 | 801 | 0.02 | |
| 4b—perpendicular | 1253 | 148 | 8.47 | |
| | | | | 8.47/0.02 = 423.50 |

Anisotropic orientation of the clay particles perpendicular to the substrate in Example 4 is demonstrated by the {Perpendicular $I_{(001)}/I_{(hk0)}$}/{Parallel $I_{(001)}/I_{(hk0)}$} anisotropy factor greater than 1.2.

EXAMPLE 4

Clay Particles in Conducting Polymer

Nanocomposite material similar to Example 1 is prepared with Cloisite Na and an electronically conductive polymer Baytron P, which is a poly(3,4-ethylene dioxythiophene styrene sulfonate), supplied by Bayer Corporation. Clay:Baytron P weight ratio in the final composition is maintained at 75:25. It is to be noted that Baytron P, is known to intercalate clay as reported in U.S. Pat. No. 6,025,119.

Figure 5A:
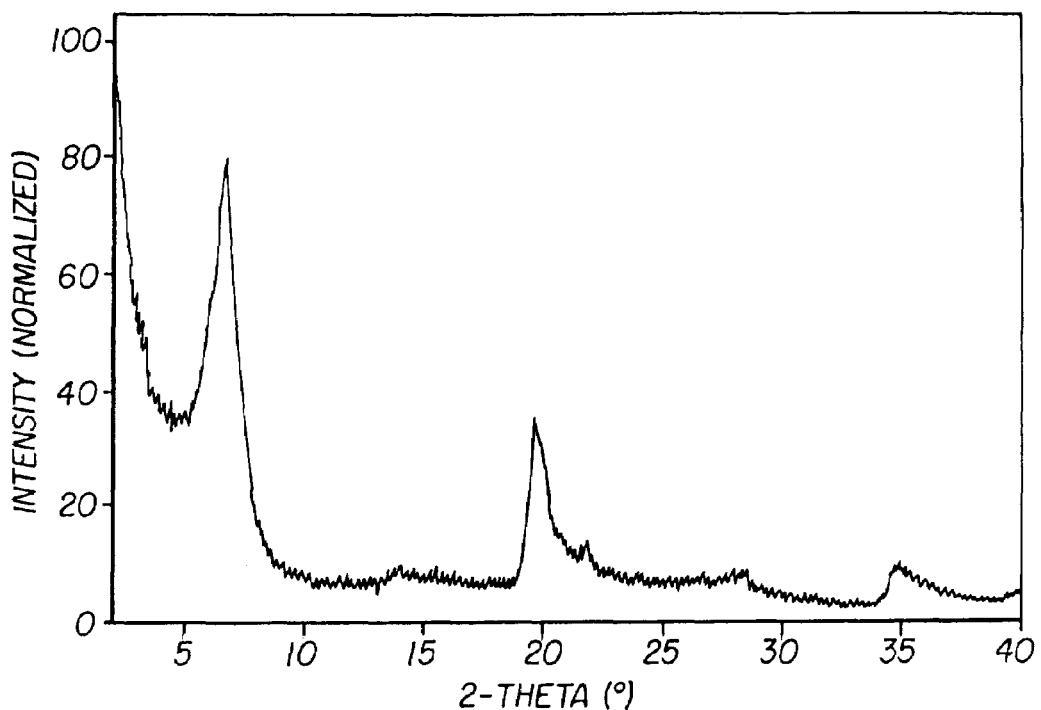
FIGS. 5a and 5b are the reflection mode X-ray diffraction data for a 75:25 Cloisite Na:Baytron P nanocomposite sample prepared in accordance with the invention, where (a) the surface grown parallel to the substrate is irradiated by the incident X-ray beam and (b) the surface grown perpendicular to the substrate is irradiated by the incident X-ray beam.

X-ray diffraction patterns are recorded for the clay:polymer nanocomposite from two different sample orientations. In FIG. 5a, data are collected with the surface grown parallel to the substrate illuminated by the incident X-ray beam and in FIG. 5b, data are collected with the surface grown perpendicular to the substrate illuminated by the incident X-ray beam. From the relative difference in peak height intensity of diffraction peaks observed in FIG. 5a compared to FIG. 5b, it is evident that the clay platelets show anisotropic alignment. The observation that the relative intensity of the diffraction peaks changes with sample orientation in the X-ray beam is evidence of anisotropic alignment of the clay in the nanocomposite as prepared in accordance with the invention. Specifically, the (001) basal plane of the clay particles preferentially lies in the plane of the nanocomposite sheet, indicating that the (hk0) planes preferentially lie parallel to the substrate and (001) planes preferentially lie perpendicular to the substrate.

Figure 5B:
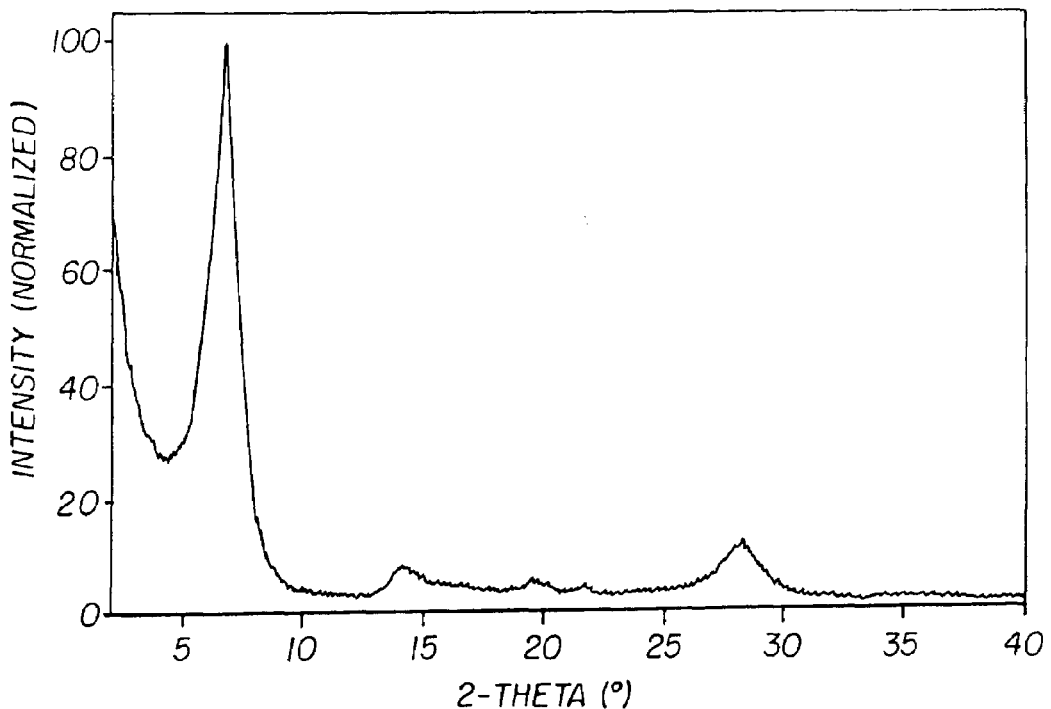

The lattice plane anisotropy was assessed using peak height intensities for the (001) and (hk0) diffraction peaks measured from FIGS. 5a and 5b, with results shown in Table 4.

TABLE 4

Lattice plane anisotropy for sample prepared in Example 4

| Sample orientation | (001) peak intensity, $I_{(001)}$ | (hk0) peak intensity, $I_{(hk0)}$ | $I_{(001)}/I_{(hk0)}$ | {Perpendicular $I_{(001)}/I_{(hk0)}$}/{Parallel $I_{(001)}/I_{(hk0)}$} anisotropy factor |
|---|---|---|---|---|
| 5a—parallel | 626 | 431 | 1.45 | |
| 5b—perpendicular | 3332 | 124 | 107.52 | |
| | | | | 107.52/1.45 = 74.15 |

Anisotropic orientation of the clay particles perpendicular to the substrate in Example 4 is demonstrated by the {Perpendicular $I_{(001)}/I_{(hk0)}$}/{Parallel $I_{(001)}/I_{(hk0)}$} anisotropy factor greater than 1.2.

EXAMPLE 5

AgBr Particles in Gelatin

An aqueous dispersion nanocomposite material is prepared with tabular AgBr and Gelatin, supplied by Eastman Kodak Company. The silver content is 1.55 mole Ag/kg emulsion, and the gelatin polymer content is 40 g gelatin/mole Ag. The AgBr:Gelatin nanocomposite was freeze dried in a Virtis Freezemobile 25ES with a Unitop 600L unit.

Figure 6A:
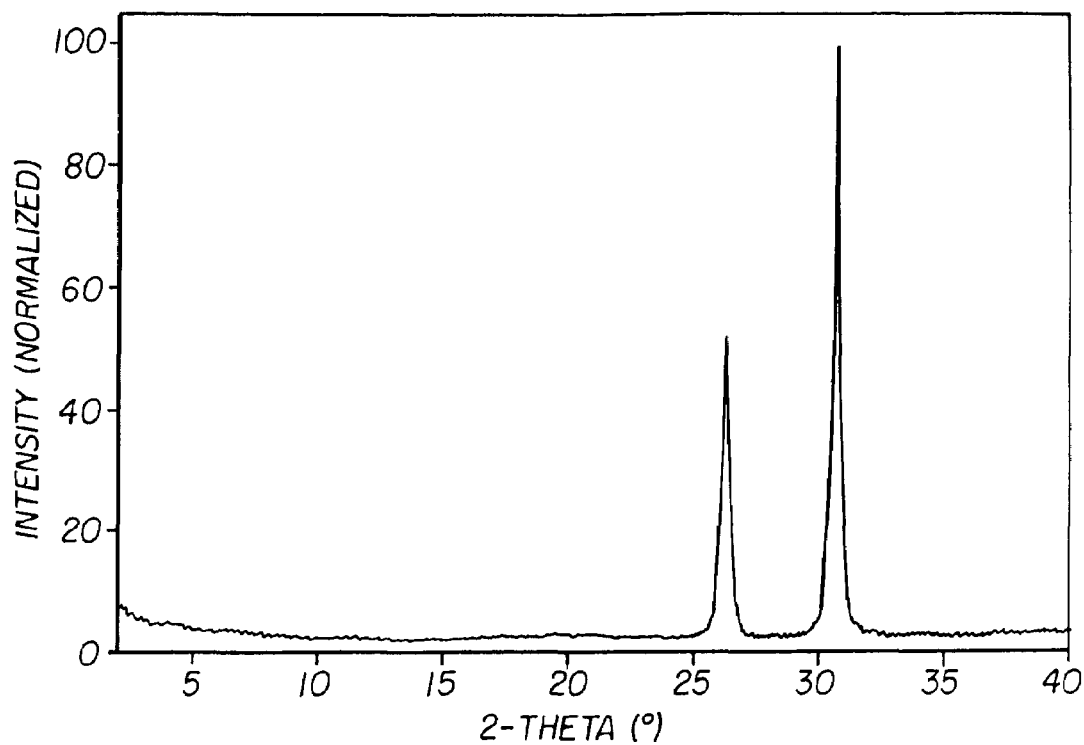
FIGS. 6a and 6b are the reflection mode X-ray diffraction data for a tabular grain AgBr:Gelatin nanocomposite sample prepared in accordance with the invention, where (a) the surface grown parallel to the substrate is irradiated by the incident X-ray beam and (b) the surface grown perpendicular to the substrate is irradiated by the incident X-ray beam.

X-ray diffraction patterns are recorded for the AgBr:polymer nanocomposite from two different sample orientations. In FIG. 6a, data are collected with the surface grown parallel to the substrate illuminated by the incident X-ray beam and in FIG. 6b, data are collected with the surface grown perpendicular to the substrate illuminated by the incident X-ray beam. From the relative difference in peak height intensity of diffraction peaks observed in FIG. 6a compared to FIG. 6b, it is evident that the tabular AgBr grains show anisotropic alignment. The observation that the relative intensity of the diffraction peaks changes with sample orientation in the X-ray beam is evidence of anisotropic alignment of the AgBr in the nanocomposite as prepared in accordance with the invention. Specifically, the (111) plane of the AgBr particles shows a preference to lie parallel to the substrate and (200) planes preferentially lie perpendicular to the substrate.

Figure 6B:
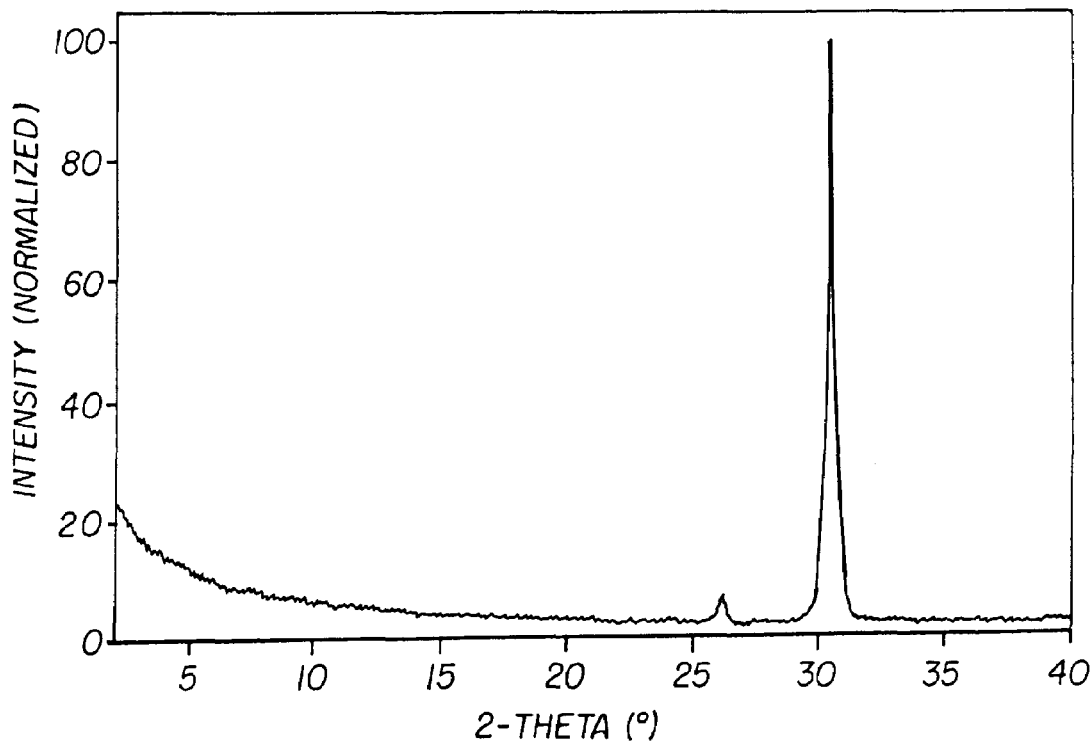

The lattice plane anisotropy was assessed using peak height intensities for the (111) and (200) diffraction peaks measured from FIGS. 6a and 6b, with results shown in Table 5.

TABLE 5

Lattice plane anisotropy for sample prepared in Example 5

| Sample orientation | (111) peak intensity, $I_{(001)}$ | (200) peak intensity, $I_{(hk0)}$ | $I_{(200)}/I_{(111)}$ | {Perpendicular $I_{(200)}/I_{(111)}$}/{Parallel $I_{(200)}/I_{(111)}$} anisotropy factor |
|---|---|---|---|---|
| 6a—parallel | 4081 | 7903 | 1.94 | |
| 6b—perpendicular | 190 | 3608 | 18.99 | |
| | | | | 18.99/1.94 = 9.79 |

Anisotropic orientation of the AgBr particles perpendicular to the substrate in Example 5 is demonstrated by the {Perpendicular $I_{(200)}/I_{(111)}$}/{Parallel $I_{(200)}/I_{(111)}$} anisotropy factor greater than 1.2.

EXAMPLE 6

Cloisite Na Clay Particles Dispersed in Water

An aqueous dispersion of Cloisite Na, a commercial grade montmorillonite clay, provided by Southern Clay Products is prepared at 2 weight % solid content. The final composition is stirred for at least 12 hours followed by freeze drying in a Virtis Freezemobile 25ES with a Unitop 600L unit.

Figure 7A:
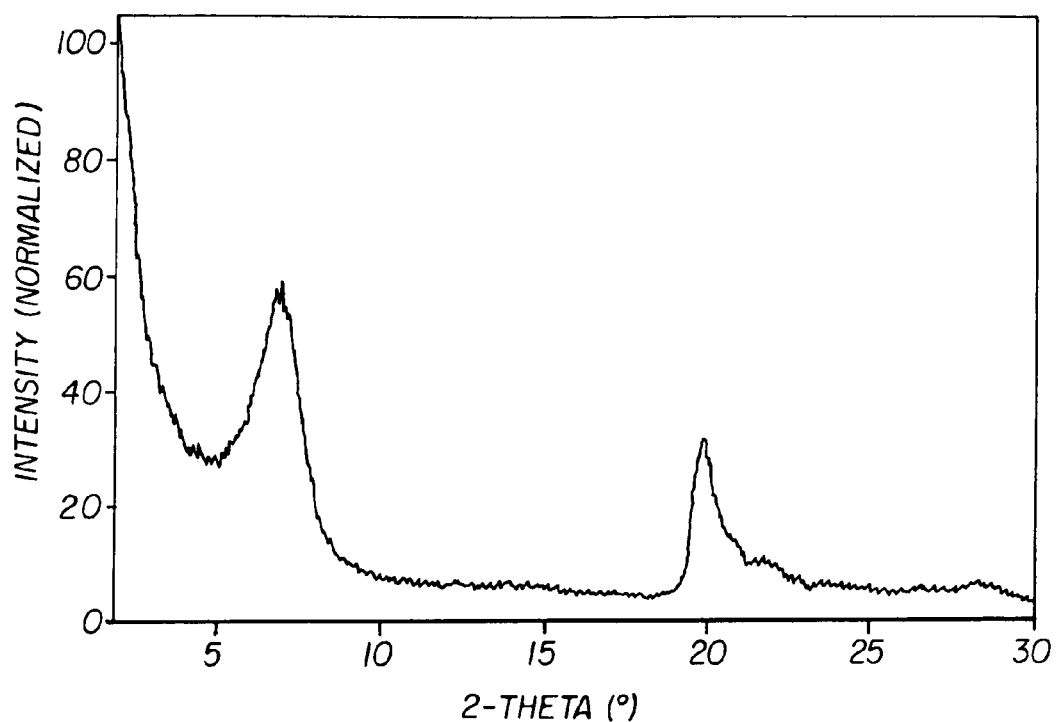
FIGS. 7a and 7b are the reflection mode X-ray diffraction data for a Cloisite Na sample prepared in accordance with the invention, where (a) the surface grown parallel to the substrate is irradiated by the incident X-ray beam and (b) the surface grown perpendicular to the substrate is irradiated by the incident X-ray beam.

X-ray diffraction patterns are recorded for the freeze-dried clay from two different sample orientations. In FIG. 7a data are collected with the surface grown parallel to the substrate irradiated by the incident X-ray beam and in FIG. 7b data are collected with the surface grown perpendicular to the substrate irradiated by the incident X-ray beam. From the relative difference in peak height intensity of diffraction peaks observed in FIG. 7a compared to FIG. 7b, it is evident that the clay platelets show anisotropic alignment. The observation that the relative intensity of the diffraction peaks changes with sample orientation in the X-ray beam is evidence of anisotropic alignment of the clay in the nanocomposite as prepared in accordance with the invention. Specifically, the (001) basal plane of the clay particles preferentially lies in the plane of the nanocomposite sheet, indicating that the (hk0) planes preferentially lie parallel to the substrate.

Figure 7B:
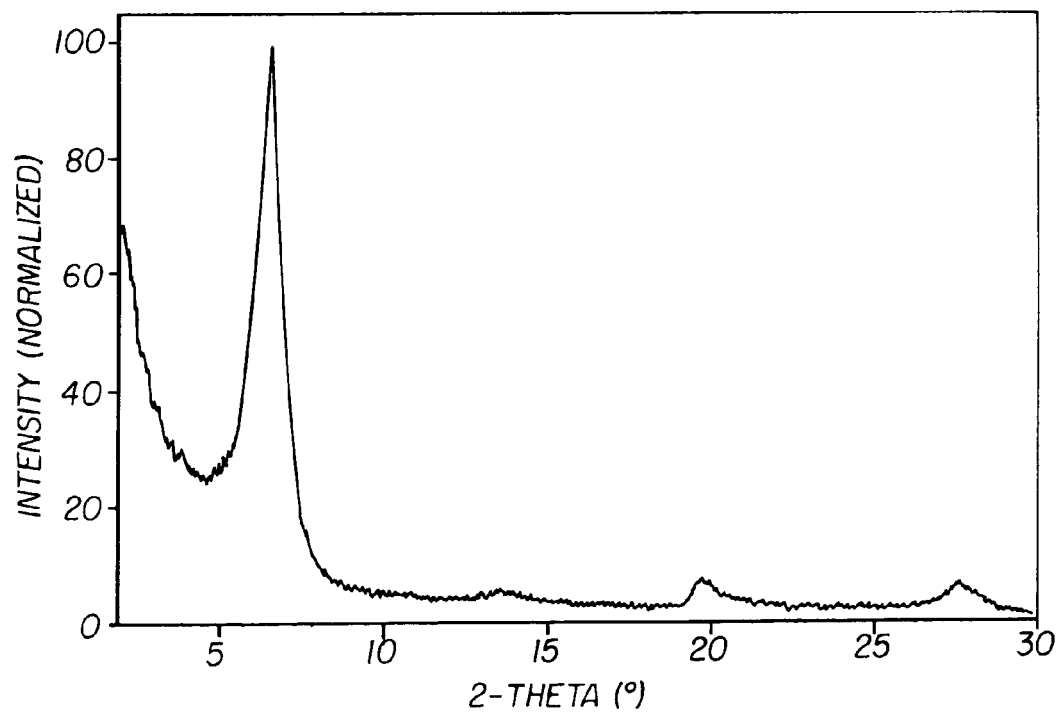

The lattice plane anisotropy was assessed using peak height intensities for the (001) and (hk0) diffraction peaks measured from FIGS. 7a and 7b, with results shown in Table 6.

TABLE 6

Lattice plane anisotropy for sample prepared in Example 6

| Sample orientation | (001) peak intensity, $I_{(001)}$ | (hk0) peak intensity, $I_{(hk0)}$ | $I_{(001)}/I_{(hk0)}$ | {Perpendicular $I_{(001)}/I_{(hk0)}$}/{Parallel $I_{(001)}/I_{(hk0)}$} anisotropy factor |
|---|---|---|---|---|
| 7a—parallel | 1106 | 566 | 1.95 | |
| 7b—perpendicular | 3110 | 145 | 21.45 | |
| | | | | 21.45/1.95 = 11.00 |

Anisotropic orientation of the clay particles perpendicular to the substrate in Example 6 is demonstrated by the {Perpendicular $I_{(001)}/I_{(hk0)}$}/{Parallel $I_{(001)}/I_{(hk0)}$} anisotropy factor greater than 1.2.

EXAMPLE 7

Laponite RDS Clay Particles Dispersed in Water

An aqueous dispersion of Laponite RDS, a commercial grade montmorillonite clay, provided by Southern Clay Products is prepared at 2 weight % solid content. The final composition is stirred for at least 12 hours followed by freeze drying in a Virtis Freezemobile 25ES with a Unitop 600L unit.

Figure 8A:
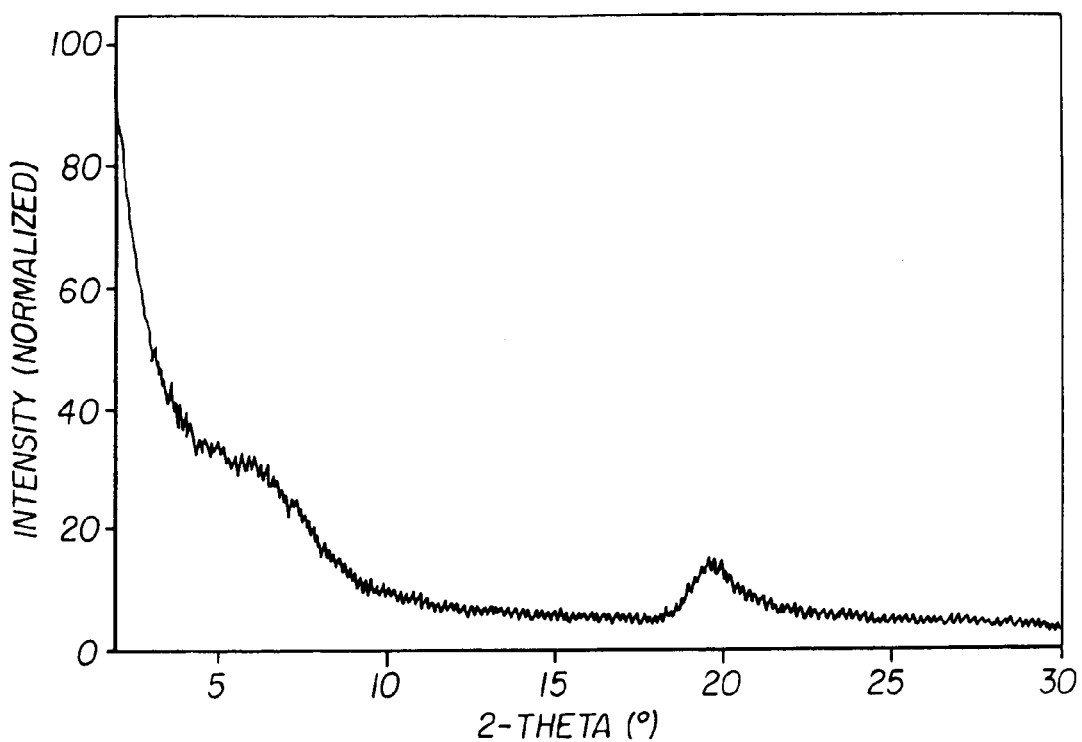
FIGS. 8a and 8b are the reflection mode X-ray diffraction data for a Laponite RDS sample prepared in accordance with the invention, where (a) the surface grown parallel to the substrate is irradiated by the incident X-ray beam and (b) the surface grown perpendicular to the substrate is irradiated by the incident X-ray beam.

X-ray diffraction patterns are recorded for the freeze-dried clay from two different sample orientations. In FIG. 8a data are collected with the surface grown parallel to the substrate irradiated by the incident X-ray beam and in FIG. 8b data are collected with the surface grown perpendicular to the substrate irradiated by the incident X-ray beam. From the relative difference in peak height intensity of diffraction peaks observed in FIG. 8a compared to FIG. 8b, it is evident that the clay platelets show anisotropic alignment. The observation that the relative intensity of the diffraction peaks changes with sample orientation in the X-ray beam is evidence of anisotropic alignment of the clay in the nanocomposite as prepared in accordance with the invention. Specifically, the (001) basal plane of the clay particles preferentially lies in the plane of the nanocomposite sheet, indicating that the (hk0) planes preferentially lie parallel to the substrate.

Figure 8B:
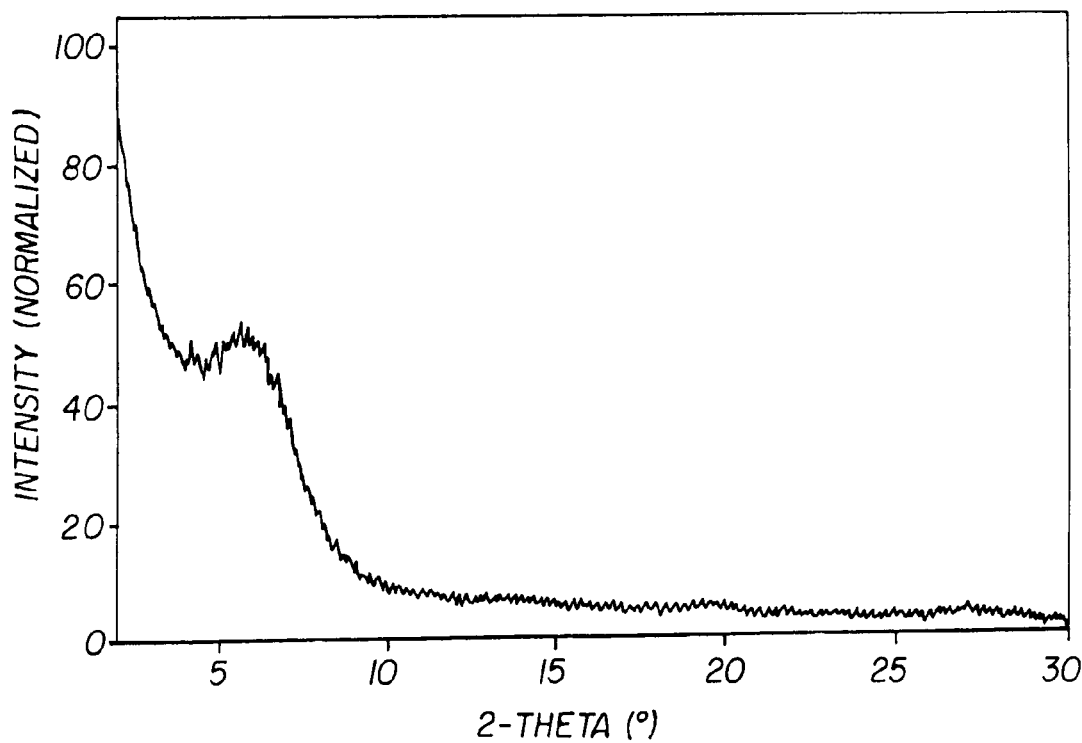

The lattice plane anisotropy was assessed using peak height intensities for the (001) and (hk0) diffraction peaks measured from FIGS. 8a and 8b, with results shown in Table 7.

TABLE 7

Lattice plane anisotropy for sample prepared in Example 7

| Sample orientation | (001) peak intensity, $I_{(001)}$ | (hk0) peak intensity, $I_{(hk0)}$ | $I_{(001)}/I_{(hk0)}$ | {Perpendicular $I_{(001)}/I_{(hk0)}$}/ {Parallel $I_{(001)}/I_{(hk0)}$} anisotropy factor |
|---|---|---|---|---|
| 8a—parallel | 1869 | 725 | 2.58 | |
| 8b—perpendicular | 3210 | 170 | 18.88 | |
| | | | | 18.88/2.58 = 7.32 |

Anisotropic orientation of the clay particles perpendicular to the substrate in Example 7 is demonstrated by the {Perpendicular $I_{(001)}/I_{(hk0)}$}/{Parallel $I_{(001)}/I_{(hk0)}$} anisotropy factor greater than 1.2.

COMPARATIVE EXAMPLE 1

Clay Particles in AQ055

An aqueous dispersion of Cloisite Na, a commercial grade montmorillonite clay, provided by Southern Clay Products is prepared at 2 weight % solid content. To this clay dispersion is added a 2% aqueous dispersion of AQ55, a polyester ionomer, supplied by Eastman Chemicals. The clay:polymer weight ratio in the final composition is maintained at 75:25. It is to be noted that AQ55, is known to intercalate clay as reported in U.S. Pat. Nos. 5,891,611; and 5,981,126. The final composition is stirred for at least 12 hours. After stirring a few drops of the final composition were deposited onto a beryllium foil and allowed to dry in ambient air. This method of preparation is considered a conventional deposition method.

Figure 9A:
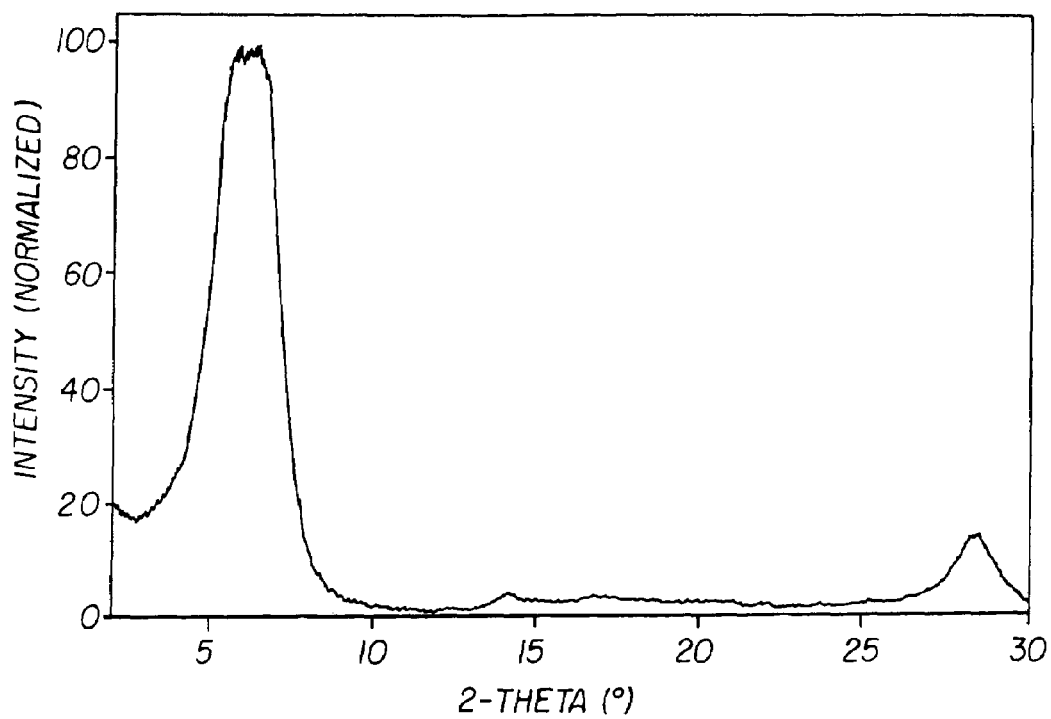
FIGS. 9a and 9b are the X-ray diffraction data for a 75:25 Cloisite Na:AQ55 nanocomposite sample, prepared by placing a few drops of the final solution onto a beryllium foil and dried in ambient air, where (a) data are collected in reflection mode with the clay film lattice planes parallel to the substrate irradiated by the incident X-ray beam and (b) data are collected in transmission mode with the clay film lattice planes perpendicular to the substrate irradiated by the incident X-ray beam.

X-ray diffraction patterns are recorded for the clay:polymer nanocomposite film from two different sample orientations. In FIG. 9a, data are collected in reflection mode with the clay film lattice planes parallel to the substrate irradiated by the incident X-ray beam and in FIG. 9b, data are collected in transmission mode with the clay film lattice planes perpendicular to the substrate irradiated by the incident X-ray beam. From the relative difference in peak height intensity of diffraction peaks observed in FIG. 9a compared to FIG. 9b, it is evident that the clay platelets show a conventional oriented alignment of particles. Specifically, the (001) planes preferentially lie parallel to the substrate and (hk0) planes preferentially lie perpendicular to the substrate.

Figure 9B:
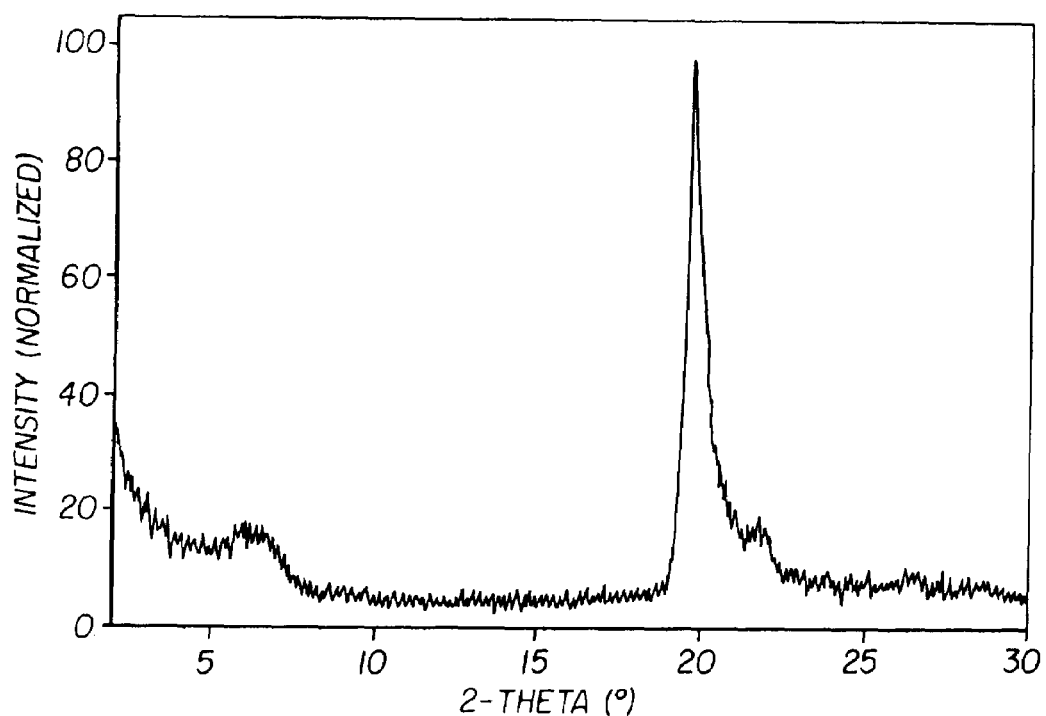

The lattice plane anisotropy was assessed using peak height intensities for the (001) and (hk0) diffraction peaks measured from FIGS. 9a and 9b, with results shown in Table 8.

TABLE 8

Lattice plane anisotropy for sample prepared in Comparative Example 1

| Sample orientation | (001) peak intensity, $I_{(001)}$ | (hk0) peak intensity, $I_{(hk0)}$ | $I_{(001)}/I_{(hk0)}$ | {Perpendicular $I_{(001)}/I_{(hk0)}$}/ {Parallel $I_{(001)}/I_{(hk0)}$} anisotropy factor |
|---|---|---|---|---|
| 9a—parallel | 6419 | 111 | 57.82 | |
| 9b—perpendicular | 14 | 337 | 0.04 | |
| | | | | 0.04/57.82 = 0.0007 |

Conventional orientation of the clay particles parallel to the substrate in Comparitive Example 1 is demonstrated by the {Perpendicular $I_{(001)}/I_{(hk0)}$}/{Parallel $I_{(001)}/I_{(hk0)}$} anisotropy factor less than 0.8. This result is in contrast to the XRD results observed for the clay:polymer nanocomposite of Example 1 where the surface grown parallel to the substrate is shown to have the (hk0) planes preferentially lying parallel to the substrate as shown in FIG. 2a, and (001) planes preferentially lying perpendicular to the substrate as shown in FIG. 2b.

It is evident that in the absence of an externally applied field, the anisotropic particles processed by the method described in the invention are oriented normal to the plane of the substrate whereas conventional coating or deposition techniques do not result in anisotropic particles being oriented normal to the plane of the substrate.

The invention has been described in detail with particular reference to certain preferred embodiments thereof, but it will be understood that variations and modifications can be effected within the spirit and scope of the invention.

What is claimed is:

1. An oriented anisotropic material comprising at least one anisotropic particle dispersed in a medium and thereafter freeze dried on a substrate, wherein said anisotropic particles are oriented by freeze drying perpendicular to said substrate.

2. The oriented anisotropic material of claim 1 wherein said anisotropic particle comprise at least one member selected from the group consisting of silver salt grain, semiconducting, amorphous, crystalline, liquid crystalline, and metallic particles.

3. The oriented anisotropic material of claim 1 wherein said anisotropic particle comprises fibers.

4. The oriented anisotropic material of claim 1 wherein said anisotropic particle comprises anisotropic nanodevices.

5. The oriented anasotropic material of claim 1 wherein said anisotropic particle comprises a layered particle.

6. The oriented anisotropic material of claim 1 wherein said medium comprises at least one member selected from the group consisting of an aqueous medium and organic medium.

7. The oriented anisotropic material of claim 1 wherein said medium comprises a dispersion of at least one dispersing polymer to splay said at least one anisotropic particle.

8. The oriented anisotropic material of claim 7 wherein said splayed particle comprises an exfoliated particle.

9. The oriented anisotropic material of claim 7 wherein said splayed particle comprises an intercalated particle.

10. The oriented anisotropic material of claim 7 wherein said at least one dispersing polymer is water soluble.

11. The oriented anisotropic material of claim 10 wherein said water soluble dispersing polymer is at least one member selected from the group consisting of gelatin, poly(vinyl alcohol), poly(ethylene oxide), polyvinylpyrrolidone, poly(acrylic acid), poly(styrene sulfonic acid), poly(acrylaniide), and quaternized polymer.

12. The oriented anisotropic material of claim 7 wherein said dispersing polymer comprises a natural polymer.

13. The oriented anisolropic material of claim 7 wherein said dispersing polymer comprises a synthetic polymer.

14. The oriented anisotropic material of claim 13 wherein said dispersing polymer comprises at least one member selected from the group consisting of polyester, polyolefin, polystyrene, polyamide and thermoset polymer.

15. The oriented anisotropic material of claim 14 wherein said thermoset dispersing polymer is at least one member selected from the group consisting of polyester, unsaturated polyester, alkyd, phenolic, amino plastic, epoxy resin, polyurethane and polysulfide.

16. The oriented anisotropic material of claim 1 wherein said anisotropic material has anisotropy factor of at least 1.2.

17. An article comprising an oriented anisotropic material and at least one matrix, wherein said oriented anisotropic material comprises anisotropic particles freeze dried on a substrate, wherein said anisotropic particles are oriented by freeze drying perpendicular to said substrate.

18. The article of claim 17 wherein said matrix comprises at least one polymer.

19. The article of claim 18 wherein said polymer comprises a natural polymer.

20. The article of claim 18 wherein said polymer comprises a synthetic polymer.

21. The article of claim 20 wherein said matrix polymer comprises at least one member selected from the group consisting of polyester, polyolefin, polystyrene, polyamide, and thermoset polymer.

22. The article of claim 21 wherein said thermoset polymer is at least one member selected from the group consisting of polyester, unsaturated polyester, alkyd, phenolic, amino plastic, epoxy resin, polyurethane and polysulfide.

23. The article of claim 18 wherein said at least one polymer is water soluble.

24. The article of claim 23 wherein said water soluble polymer is at least one member selected from the group consisting of gelatin, poly(vinyl alcohol), poly(ethylene oxide), polyvinylpyrrolidone, poly(acrylic acid), poly(styrene sulfonic acid), poly(acrylamide, and quaternized polymer.

25. The article of claim 17 wherein said anisotropic particle is at least one member selected from the group consisting of silver salt grains, semiconducting particles, amorphous, crystalline, liquid crystalline, and metallic particles.

26. The article of claim 17 wherein said anisotropic particle comprises fibers.

27. The article of claim 17 wherein said anisotropic particle comprises anisotropic nanodevices.

28. The article of claim 17 wherein said anisotropic particle comprises a layered particle.

29. The article of claim 17 wherein said freeze dried anisotropic material comprises anisotropic particles splayed with at least one polymer.

30. The oriented anisotropic material of claim 17 wherein said anisotropic material has anisotropy factor of at least 1.2.

31. An oriented anisotropic material comprising at least one anisotropic particle dispersed in a synthetic thermoset polymer and thereafter freeze dried, wherein said oriented anisotropic material has an anisotropy factor of at least 1.2.

32. The oriented anisotropic material of claim 31 wherein said anisotropic particle comprise at least one member selected from the group consisting of silver salt grain, semiconducting, amorphous, crystalline, liquid crystalline, and metallic particles.

33. The oriented anisotropic material of claim 31 wherein said anisotropic particle comprises fibers.

34. The oriented anisotropic material of claim 31 wherein said anisotropic particle comprises anisotropic nanodevices.

35. The oriented anisotropic material of claim 31 wherein said anisotropic particle comprises a layered particle.

36. The oriented anisotropic material of claim 31 wherein said splayed particle comprises an exfoliated particle.

37. The oriented anisotropic material of claim 31 wherein said splayed particle comprises an intercalated particle.

38. The oriented anisotropic material of claim 31 wherein said at least one dispersing polymer is water soluble.

39. The oriented anisotropic material of claim 38 wherein said water soluble dispersing polymer is at least one member selected from the group consisting of gelatin, poly(vinyl alcohol), poly(ethylene oxide), polyvinylpyrrolidone, poly(acrylic acid), poly(styreme sulfonic acid), poly(acrylamide), and quaternized polymer.

40. The oriented anisotropic material of claim 31 wherein said thermoset dispersing polymer is at least one member selected from the group consisting of polyester, unsaturated polyester, alkyd, phenolic, amino plastic, epoxy resin, polyurethane and polysulfide.

\* \* \* \* \*